US012669341B2

(12) United States Patent
Dong et al.

(10) Patent No.:  US 12,669,341 B2
(45) **Date of Patent:  \*Jun. 30, 2026**

(54) SPEED REASONING IN THE PRESENCE OF UNCERTAINTY WHEN PULLING OVER

(71) Applicant: Waymo LLC, Mountain View, CA (US)

(72) Inventors: Xu Dong, Mountain View, CA (US); Jonathan Lee Pedersen, San Francisco, CA (US); Jakob Robert Zwiener, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 18/513,884

(22) Filed: Nov. 20, 2023

(65) Prior Publication Data

US 2024/0151544 A1      May 9, 2024

Related U.S. Application Data

(63) Continuation of application No. 17/410,022, filed on Aug. 24, 2021, now Pat. No. 11,859,989.

(51) Int. Cl.
*G01C 21/34*       (2006.01)
*B60W 30/08*       (2012.01)
*B60W 60/00*       (2020.01)

(52) U.S. Cl.
CPC ......... *G01C 21/3461* (2013.01); *B60W 30/08* (2013.01); *B60W 60/0015* (2020.02); *B60W 2554/4048* (2020.02); *B60W 2554/80* (2020.02)

(58) Field of Classification Search
CPC .............. G01C 21/3461; B60W 30/08; B60W 60/0015; B60W 2554/4048; B60W 2554/80; B60W 60/0025; B60W 60/0013
See application file for complete search history.

(56) References Cited

U.S. PATENT DOCUMENTS 9,523,984 B1     12/2016  Herbach et al.
10,183,665 B2     1/2019  Shani
(Continued)

OTHER PUBLICATIONS

Chinrungrueng, Jatuporn , et al., Smart Parking: an Application of optical Wireless Sensor Network, IEEE, 2007, pp. 1-4.
(Continued)

*Primary Examiner* — Anne Marie Antonucci
*Assistant Examiner* — Jingi Wang
(74) *Attorney, Agent, or Firm* — Botos Churchill IP Law

(57)          ABSTRACT

The technology involves pullover maneuvers for vehicles operating in an autonomous driving mode. A vehicle operating in an autonomous driving mode is able to identify parking locations that may be occluded or otherwise not readily visible. A best case estimation for any potential parking locations, including partially or fully occluded areas, is compared against predictions for identified visible parking locations. This can include calculating a cost for each potential parking location and comparing that cost to a baseline cost. Upon determining that an occluded location would provide a more viable option than any visible parking locations, the vehicle is able to initiate a driving adjustment (e.g., slow down) prior to arriving at the occluded location. This enables the vehicle to minimize passenger discomfort while also providing notice to other road users of an intent to pull over.

20 Claims, 18 Drawing Sheets

(56) References Cited

U.S. PATENT DOCUMENTS

| | | | |
|---|---|---|---|
| 10,214,240 B2 | 2/2019 | Ghose et al. | |
| 10,394,234 B2 | 8/2019 | Salour et al. | |
| 10,467,581 B2 | 11/2019 | Laury et al. | |
| 10,627,825 B2 | 4/2020 | Gutmann et al. | |
| 11,048,256 B2 | 6/2021 | Dyer et al. | |
| 11,126,180 B1* | 9/2021 | Kobilarov | B60W 30/18163 |
| 2017/0200367 A1* | 7/2017 | Mielenz | G05D 1/0212 |
| 2017/0274901 A1* | 9/2017 | Herbach | B60W 10/20 |
| 2018/0304926 A1* | 10/2018 | Ghose | B62D 15/0285 |
| 2019/0235499 A1 | 8/2019 | Kazemi et al. | |
| 2020/0377092 A1 | 12/2020 | Torres et al. | |
| 2021/0041870 A1 | 2/2021 | Dyer et al. | |
| 2021/0053567 A1 | 2/2021 | Dyer et al. | |
| 2021/0370929 A1* | 12/2021 | Ji | B60W 10/18 |

OTHER PUBLICATIONS

Miura, Shun , et al., Evaluation of Parking Search using Sensor Network, ResearchGate, IEEE, 2006 pp. 1-7.

Narri, Vandana , et al., Set-Membership Estimation in Shared Situational Awareness for Automated Vehicles in Occluded Scenarios, arXiv:2103.01791v1, Mar. 2021, pp. 1-7.

Naumann, Maximillian , et al., Safe but not Overcautious Motion Planning under Occlusions and Limited Sensor Range, IEEE, Jun. 2019, pp. 1-6.

Zhang, Zixu , et al., Safe Occlusion-aware Autonomous Driving via Game-Theoretic Active Perception, arXiv:2105.08169v2, Jun. 2021, pp. 1-13.

* cited by examiner

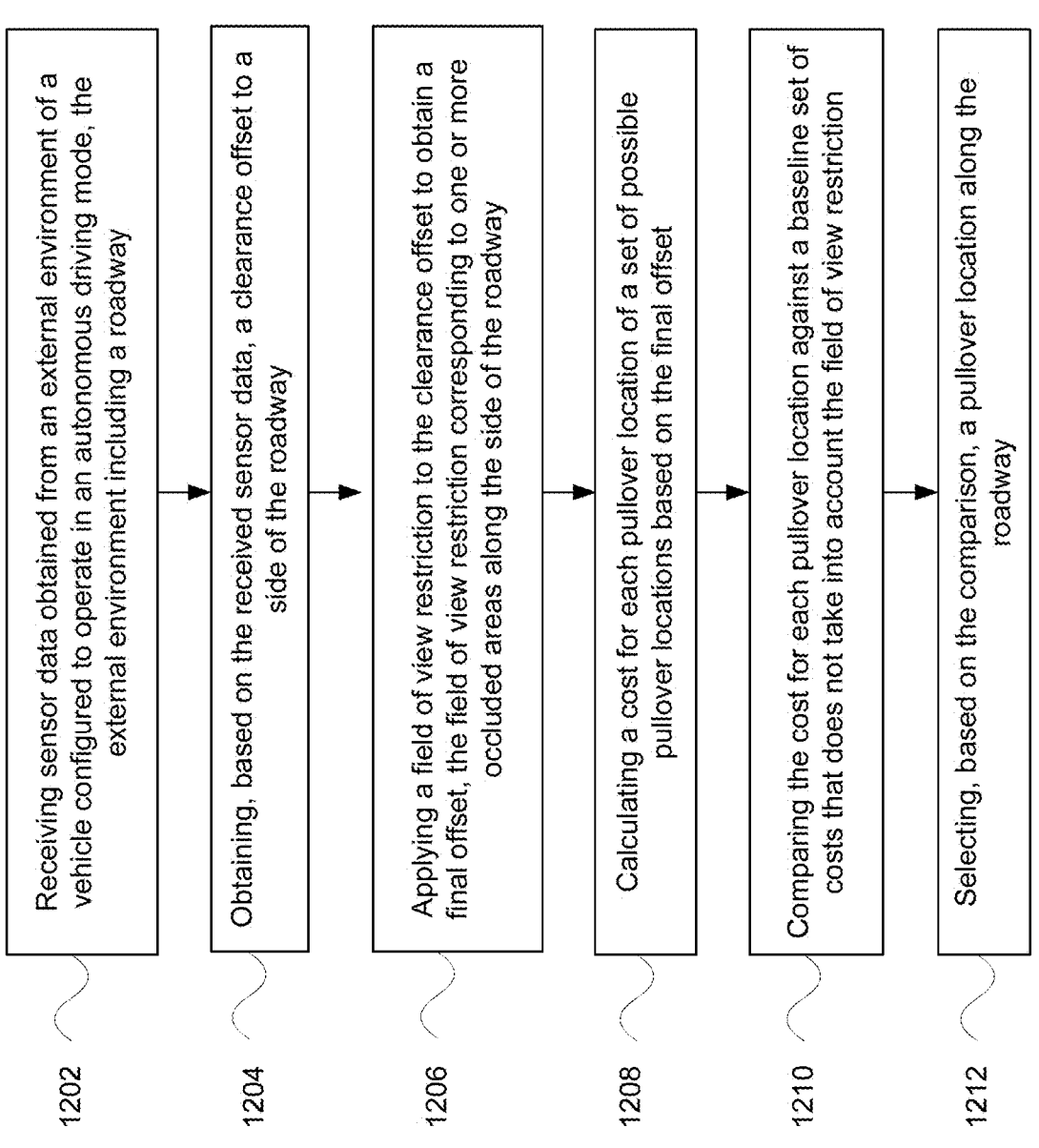

Fig. 12
1200

1202  Receiving sensor data obtained from an external environment of a vehicle configured to operate in an autonomous driving mode, the external environment including a roadway 1204  Obtaining, based on the received sensor data, a clearance offset to a side of the roadway 1206  Applying a field of view restriction to the clearance offset to obtain a final offset, the field of view restriction corresponding to one or more occluded areas along the side of the roadway 1208  Calculating a cost for each pullover location of a set of possible pullover locations based on the final offset 1210  Comparing the cost for each pullover location against a baseline set of costs that does not take into account the field of view restriction 1212  Selecting, based on the comparison, a pullover location along the roadway

SPEED REASONING IN THE PRESENCE OF UNCERTAINTY WHEN PULLING OVER

CROSS REFERENCE TO RELATED APPLICATIONS

The present application is a continuation of U.S. patent application Ser. No. 17/410,022, filed Aug. 24, 2021, the entire disclosure of which is incorporated herein by reference.

BACKGROUND

Vehicles that do not require a human driver can be used to aid in the transport of passengers or cargo from one location to another. Such vehicles may operate in a fully autonomous mode or a partially autonomous mode where a person may provide some driving input in certain situations. When approaching a destination or at any point during a trip, a vehicle operating in an autonomous driving mode may continuously look for pullover locations to stop the vehicle. These locations may be used, for example, for emergencies or to pick up and/or drop off passengers or goods as part of a transportation service. The vehicle may evaluate pullover locations that are at least some fixed distance away from the vehicle to avoid excessively fast lateral shifting and hard braking. However, such approaches do not take into account vehicle dynamics and may unnecessarily restrict where the vehicle can actually pull over. Other issues, such as occlusions in the environment or limited sensor availability, can reduce the likelihood of the vehicle being able to identify a suitable spot to pull over. This, in turn, can adversely affect the quality of the pullover location.

BRIEF SUMMARY

The technology relates to enhancing the ability of a vehicle operating in an autonomous driving mode to identify parking locations that are occluded or otherwise not currently visible. Best case estimations of what could be viable (but hidden) parking spaces are compared against predictions for identified visible parking locations. Upon a determination that an estimated location would provide a more viable option than the visible parking locations, the vehicle is able to initiate a driving adjustment (e.g., slow down) prior to arriving at the estimated location. This enables the vehicle to minimize passenger discomfort while also providing notice to other road users of an intent to pull over.

According to one aspect of the technology, a method comprises receiving, by one or more processors of a computing system, sensor data obtained from an external environment of a vehicle configured to operate in an autonomous driving mode, the external environment including a roadway; obtaining, by the one or more processors based on the received sensor data, a clearance offset to a side of the roadway; applying, by the one or more processors, a field of view restriction to the clearance offset to obtain a final offset, the field of view restriction corresponding to one or more occluded areas along the side of the roadway; calculating, by the one or more processors, a cost for each pullover location of a set of possible pullover locations based on the final offset; comparing, by the one or more processors, the cost for each pullover location against a baseline set of costs that does not take into account the field of view restriction; and selecting, by the one or more processors based on the comparison, a pullover location along the roadway.

The method may further comprise causing the vehicle to perform a pullover maneuver in the autonomous driving mode according to the selected pullover location. Here, causing the vehicle to perform the pullover maneuver may include determining a slow region beginning at a first point prior to the selected pullover location and ending at a second point farther from a current position of the vehicle than the first point. At least one pullover location of the set of possible pullover locations may be an occluded location.

Calculating the cost for each pullover location may include calculating spatial information and using the spatial information to calculate costs across waypoints associated with the set of possible pullover locations. Calculating the spatial information may include determining how the vehicle would end up being positioned if the vehicle were to be parked at a given one of the possible pullover locations. Here, determining how the vehicle would end up being positioned may include estimating a final parking angle and how far the vehicle would be from a nearest driving lane. Calculating the spatial information may include evaluating one or more of a distance from a road edge, a parking angle, or a distance from a requested pullover location. Using the spatial information to calculate costs across waypoints associated with the set of possible pullover locations may comprise combining different aspects of the spatial information into a final cost to express a location quality.

The final offset may combine the clearance offset, a field of view limited offset and a predicted offset. Here, the field of view limited offset may encompass objects that can be detected from the sensor data obtained from the external environment of a vehicle. The field of view limited offset may further encompass how far to the side of the roadway the vehicle has a field of view. The predicted offset may be an offset around objects that can be detected by a perception system of the vehicle.

In another example, the baseline set of costs is a threshold for selecting the pullover location along the roadway. In this case, selecting the pullover location along the roadway may include determining whether the cost for each pullover location associated any of the one or more occluded areas is below the threshold by a selected amount.

According to another aspect of the technology, a vehicle configured to operate in an autonomous driving mode is provided. The vehicle comprises a perception system including one or more sensors; a driving system including a steering subsystem, an acceleration subsystem and a deceleration subsystem to control driving of the vehicle; a positioning system configured to determine a current position of the vehicle and a control system including one or more processors. The one or more sensors are configured to obtain sensor data associated with objects in an external environment of the vehicle, in which the external environment includes a roadway. The control system is operatively coupled to the driving system, the perception system and the positioning system. The control system is configured to: receive sensor data obtained from the perception system; obtain, based on the received sensor data, a clearance offset to a side of the roadway; apply a field of view restriction to the clearance offset to obtain a final offset, the field of view restriction corresponding to one or more occluded areas along the side of the roadway; calculate a cost for each pullover location of a set of possible pullover locations based on the final offset; compare the cost for each pullover location against a baseline set of costs that does not take into account the field of view restriction; and select, based on the comparison, a pullover location along the roadway.

The control system may be further configured to cause the driving system of the vehicle to perform a pullover maneuver in the autonomous driving mode according to the selected pullover location. Here, causing the driving system to perform the pullover maneuver may include the control system determining a slow region beginning at a first point prior to the selected pullover location and ending at a second point farther from a current position of the vehicle than the first point. The final offset may combine the clearance offset, a field of view limited offset and a predicted offset. And the baseline set of costs may be a threshold for selecting the pullover location along the roadway.

BRIEF DESCRIPTION OF THE DRAWINGS

FIG. 12 illustrates an example method in accordance with aspects of the technology.

DETAILED DESCRIPTION

Overview

Figure 1A:
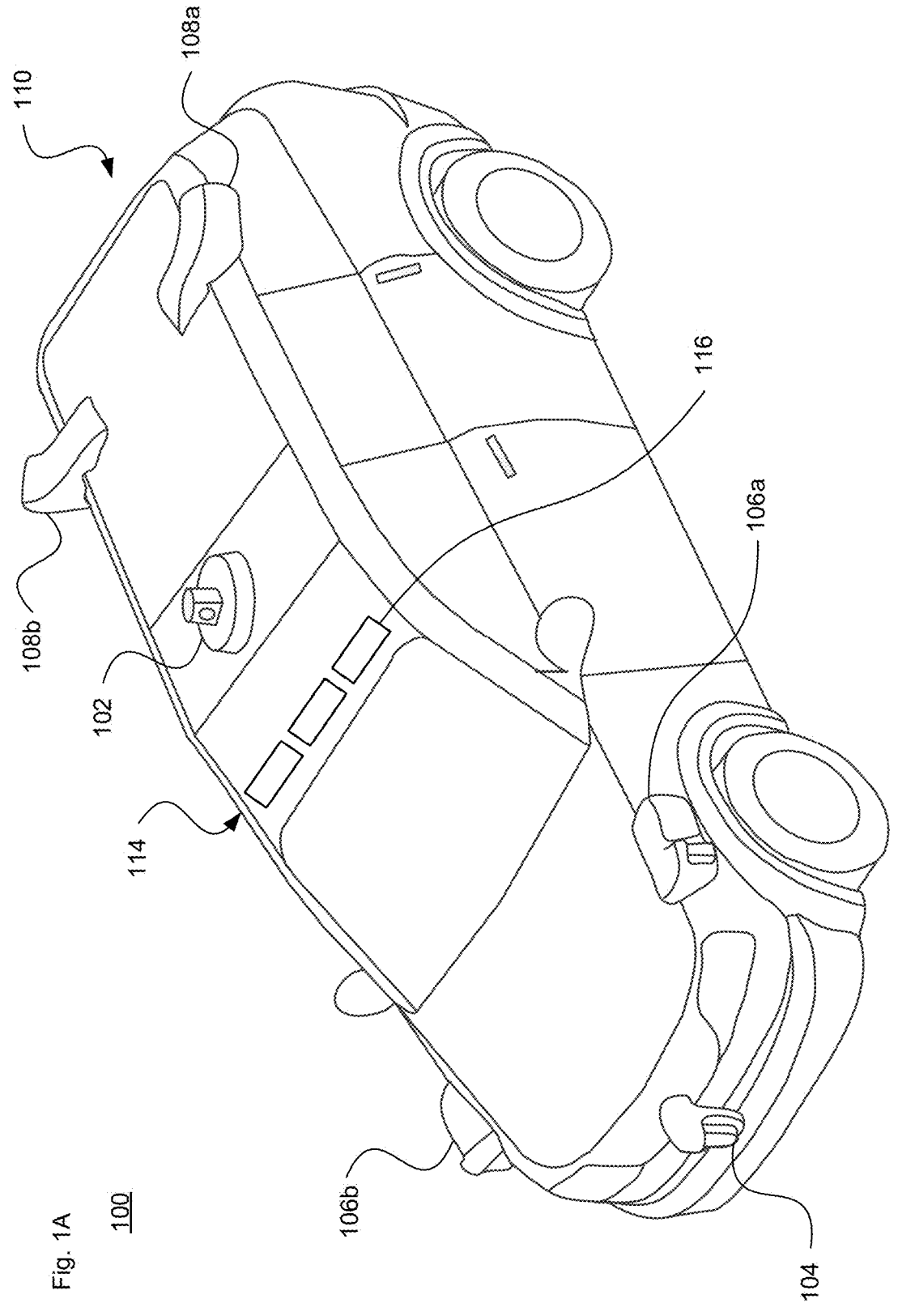
FIGS. 1A-B illustrate an example passenger-type vehicle configured for use with aspects of the technology.

The technology involves pullover maneuvers for vehicles operating in an autonomous driving mode. For instance, based on an upcoming destination the vehicle's computing system may continuously look for locations at which to stop. This may be done to pick up and/or drop off passengers, make a delivery, pull over for emergency vehicles, etc.

Waypoints are sampled locations in the continuous physical space along the roadway. In many instances, the vehicle will have full visibility of the space (from the driving lane to the road edge). However, it is difficult to see through vehicles, around corners, behind moving cars, or through buildings. Thus, the computing system may make a lot of predictions (e.g., learned and heuristic) about where parked vehicles and moving road users will be. Using on-board sensors, maps, and real-time and historical data, the system can keep track of and predict where the vehicle can and cannot "see", to identify suitable pullover locations. In some instances, potential pullover locations may be partially or fully occluded at a given point in time as the vehicle is operating. It is also desirable to avoid slowing prematurely for a pullover spot, as this can confuse or frustrate other drivers. Thus, according to aspects of the technology, the vehicle's computing system should adjust the vehicle's speed based on what the vehicle can and cannot detect in its environment.

Candidate locations should be some minimum distance away from the vehicle, and the vehicle's dynamics should be taken into account to avoid excessively fast lateral shifting and potential hard braking of the vehicle. For instance, rather than limiting pullover locations based on fixed distance, they can instead be limited based on deceleration feasibility (e.g., the ability to decelerate to a stop at a given deceleration limit). Moreover, because these deceleration limits can be fixed in advance, they can be selected in order to ensure that passengers and other road users (other vehicles, pedestrians, bicyclists, etc.), are not made uncomfortable.

The dynamics may include the vehicle's current speed, current deceleration (or acceleration), and current rate of deceleration (or acceleration). In addition, vehicle dynamics may also take into consideration additional factors such as actuator delays, current actuator state, controllability, road surface conditions, etc. As such, the vehicle dynamics may be both current and estimated. For example, the vehicle's computing system may predict how quickly the vehicle will achieve a certain deceleration in the future. Most deceleration values (e.g. $-2$ m/s$^2$ acceleration) cannot be achieved instantaneously, so the process of reaching a desired deceleration and the traveled distance during that time could be estimated or predicted. As one simple example, using the vehicle's current speed, deceleration, and rate of deceleration, the vehicle's computing system may estimate a distance between the vehicle and a pullover location for the vehicle, or a distance required for the vehicle to come to a complete stop within a pullover deceleration limit.

Deceleration limits are typically used to determine whether certain trajectories are feasible for an autonomous vehicle. For example, when determining trajectories, the vehicle's planner system may identify a number of objects in the vehicle's environment and may generate a corresponding set of constraints for each of these objects. The planner system may then attempt to generate a trajectory that avoids the constraints (e.g., does not intersect with or come within a threshold distance to any of the identified objects), while at the same time does not exceed the deceleration limit. In some instances, if the planner system is unable to generate a trajectory, the deceleration limit may be adjusted.

However, when pulling over, rather than adjusting the deceleration limit for the purposes of the pullover, the vehicle's computing devices may simply identify another pullover location. The vehicle's computing devices may utilize an appropriate pullover deceleration limit or discomfort to choose a pullover location further away that the vehicle can reach more comfortably for any passenger or tertiary persons. In this regard, the vehicle's computing devices may utilize a pullover deceleration limit which may be different from the deceleration limit for nominal driving.

As the vehicle approaches a destination, it may begin to evaluate pullover locations. In some cases, pullover locations may be known in advance. In other cases, pullover locations may be identified from received sensor data, which may indicate a given spot is currently vacant or will shortly become vacant. And in still other cases, potential pullover locations may be partly or fully occluded.

Each potential pullover location may be evaluated, for example, to determine which location has the lowest "cost". In addition, for each pullover location, the vehicle's computing devices may determine a pullover start location at which the vehicle will need to begin to adjust its lateral position in the road in order to pull into the pullover location. The location may be determined based on the difference between the lateral offsets in the vehicle's current location and the lateral offset in the planned pullover location. In other words, the lateral offset may correspond to how far to the left or right the vehicle would need to adjust itself from its current location to the pullover location.

The vehicle's computing devices may then determine whether a pullover location is feasible based on the vehicle dynamics, the pullover start location, and the pullover deceleration limit. For example, using the vehicle's current speed, deceleration, and rate of deceleration and various other factors as discussed further below, the vehicle's computing system may estimate a first distance required for the vehicle to come to a complete stop within the pullover deceleration limit. The vehicle's computing devices may then compare this distance with a second distance between the vehicle's current location and the pullover start location to determine whether the pullover location is feasible.

The vehicle's computing devices may constantly continue looking for the "best" pullover location, such as the one with the lowest cost. This may continue, for example, until some point after the vehicle reaches a pullover start location of a selected pullover location and begins to laterally shift towards the selected pullover location. In this regard, the vehicle's computing devices may still have time to abort a pullover before the vehicle begins to laterally shift towards the selected pullover location. As such, the vehicle's computing devices will continue to assess whether the selected pullover location is feasible and/or any other nearby pullover location is a better option by identifying pullover locations and evaluating them as described above.

According to aspects of the technology, using predictions and information such as the roadgraph, map, traffic predictions, parked vehicle predictions, sensor fields of view, etc., the planner module or other part of the vehicle's computing system may evaluate this situation: if the vehicle were to be able to pullover in an area it cannot currently see, how good would that pullover location be? If it would be better than the other pullover candidates that the vehicle can detect with its perception system or that are known in advance, it would be beneficial to slow slightly before approaching that occluded pullover location. This approach effectively compares the predictions of "what will likely happen" based on observed or known information versus a best-case "what could happen" given partial or no information about an occluded location. Here, when the best-case pullover at a location is determined by the vehicle to be significantly better (e.g., having a lower cost, such as 5-20% lower or more) than the other (likely to happen) predictions, then the vehicle should slow down to give additional time to explore the area of the occluded pullover location. This effectively helps the planner module or other element of the computing system to strike a balance between quickness, quality, and convenience.

Example Vehicle Systems

Figure 1B:
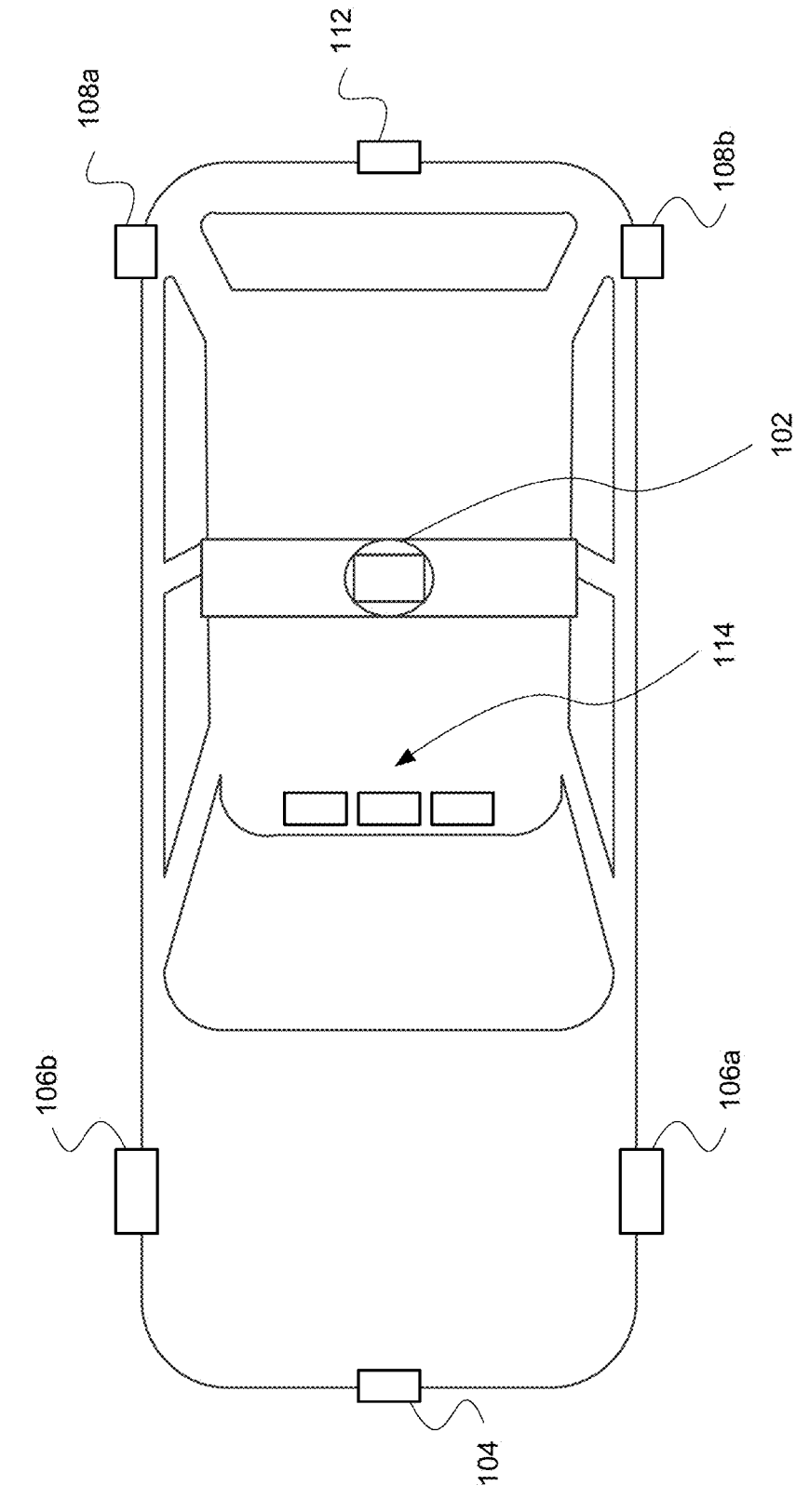

FIG. 1A illustrates a perspective view of an example passenger vehicle 100, such as a minivan, sedan, sport utility vehicle (SUV) or other vehicle. FIG. 1B illustrates a top-down view of the passenger vehicle 100. The passenger vehicle 100 may include various sensors for obtaining information about the vehicle's external environment. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional (partial) automation that can enable a person in the driver's seat to take control as warranted. In contrast, Level 4 is a high automation fully autonomous level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
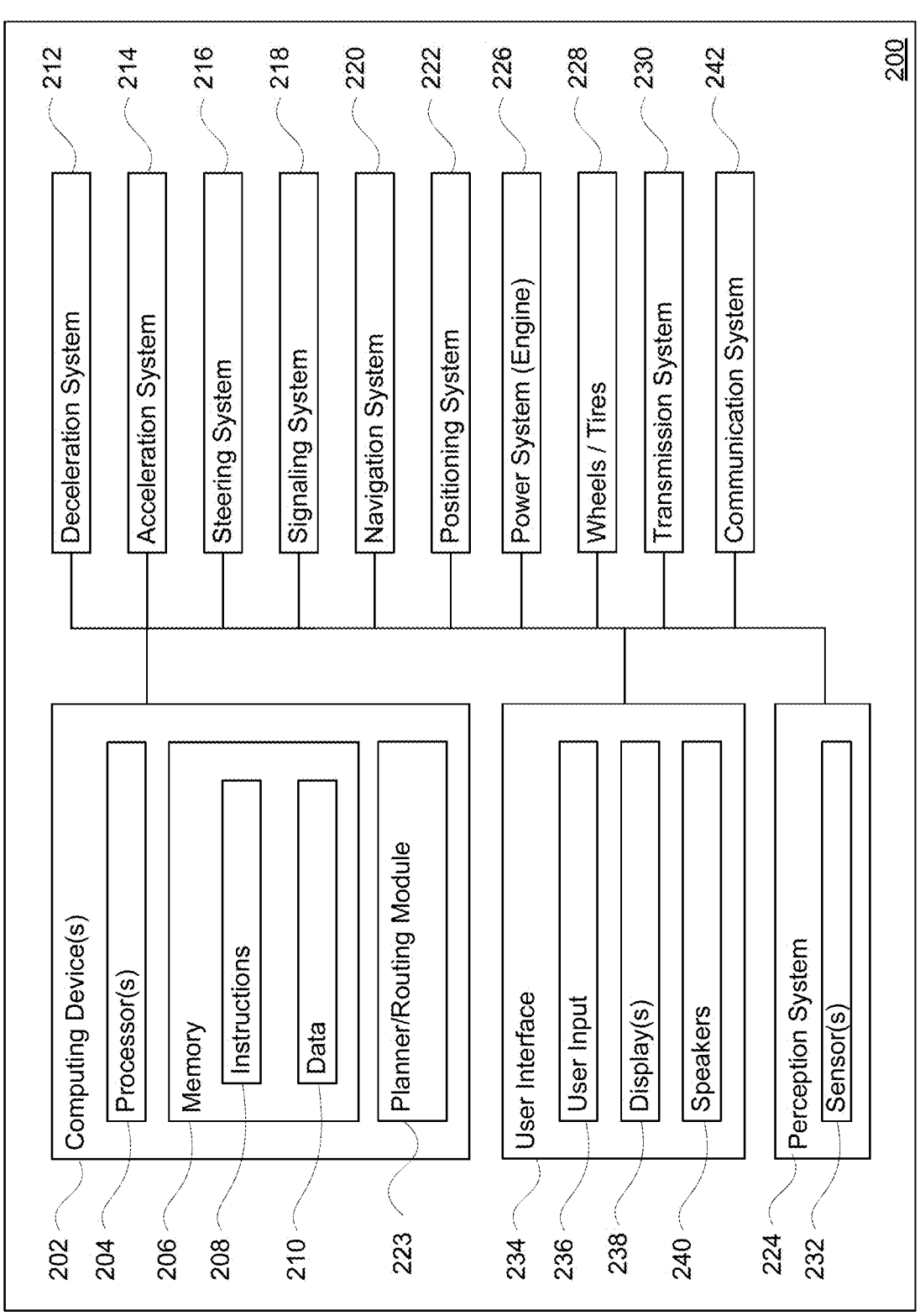
FIG. 2 is a block diagram of systems of an example passenger-type vehicle in accordance with aspects of the technology.

FIG. 2 illustrates a block diagram 200 with various components and systems of an exemplary vehicle, such as passenger vehicle 100, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose).

The autonomous driving computing system may employ a planner/routing module 223, in accordance with the navigation system 220, the positioning system 222 and/or other components of the system, e.g., for determining a route from a starting point to a destination, planning a pullover maneuver, or for making modifications to various driving aspects in view of current or expected operating conditions. This module may be used by the computing system in order to generate short-term trajectories that allow the vehicle to follow routes. In this regard, the planner/routing module 223 may utilize stored detailed map information, real time traffic information (e.g., updated as received from a remote computing device), pullover spot information and/or other details when planning a route or a pullover maneuver.

The trajectories may define the specific characteristics of acceleration, deceleration, speed, etc. to allow the vehicle to follow the route towards reaching a destination, pullover spot or other location. The trajectory may include a geometry component and a speed component. The geometry component may be determined based on various factors including the route from the routing system. The speed component may be determined using an iterative process using a plurality of constraints. The constraints may be based on the predicted trajectories of other objects detected in the vehicle's environment (e.g., the vehicle must not come too close to these other objects) as well as characteristics of the vehicle and other limits, such as a maximum allowable deceleration limit. The planning system may attempt to determine a speed profile by starting with a fastest allowable speed which may then be reduced in order to satisfy all constraints of the set of constraints. For instance, the planner portion of the planner/routing module is unable to find a solution, the maximum allowable deceleration limit (and/or other constraints) may be adjusted until a solution is found. The resulting trajectory may then be used to control the vehicle, for instance by controlling braking, acceleration and steering of the vehicle.

The computing devices 202 are also operatively coupled to a perception system 224 (for detecting objects in the vehicle's environment), a power system 226 (for example, a battery and/or internal combustion engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store the map information. As an example, these maps may identify the shape and elevation of roadways, lane markers, intersections, crosswalks, speed limits, traffic signal lights, buildings, signs, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors 232 may also detect certain aspects of weather conditions, such as snow, rain or water spray, or puddles, ice or other materials on the roadway.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, lateral forces as the vehicle turns to the left or right, and other factors associated with the equipment of the vehicle itself.

As discussed further below, the raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into the side-view mirrors on the vehicle. In another example, other sensors may be part of the roof-top housing 102, or other sensor housings or units 106*a,b*, 108*a,b*, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

In view of the structures and configurations described above and illustrated in the figures, various aspects will now be described in accordance with aspects of the technology.

Figure 3A:
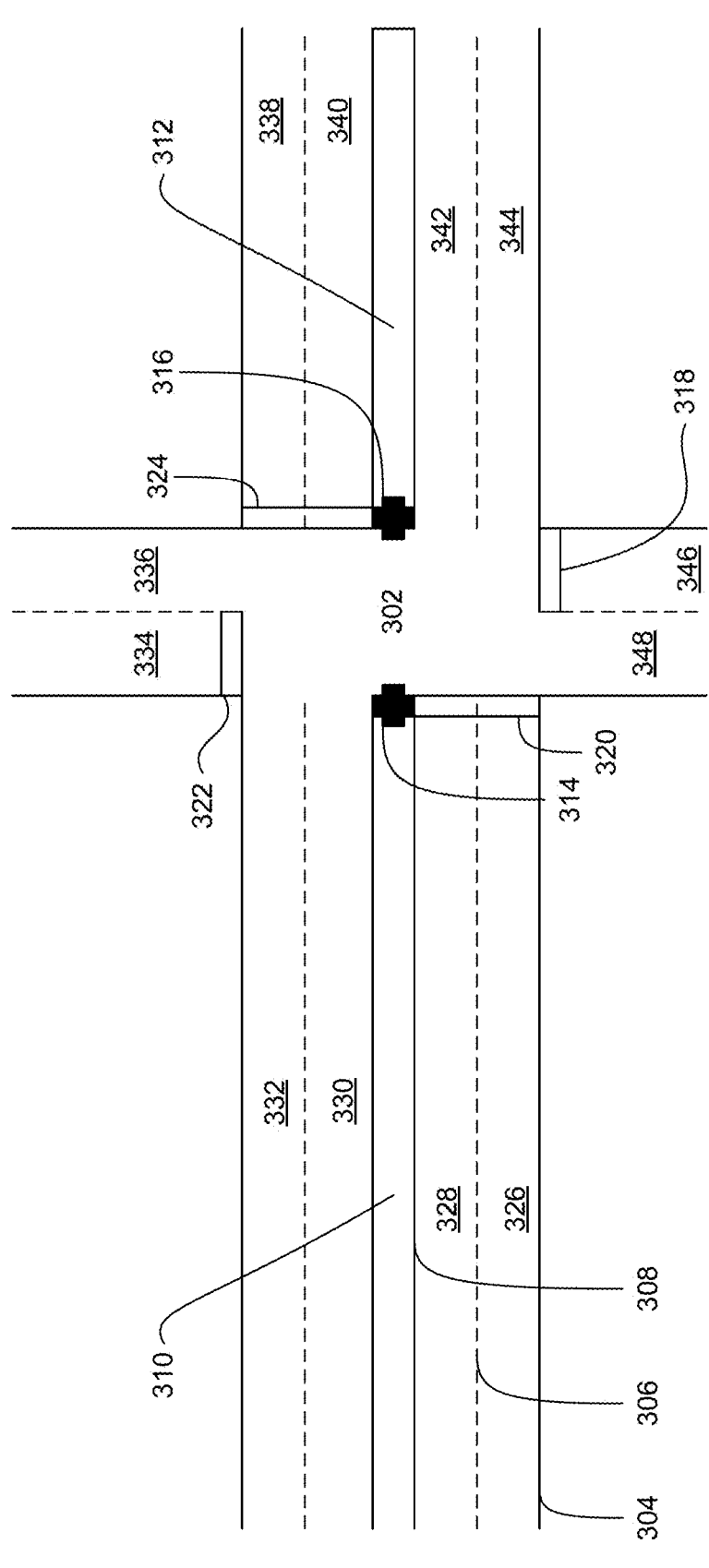
FIGS. 3A-C illustrate map-related features in accordance with aspects of the technology.

As noted above, map information may be used by the planner/routing module. FIG. 3A illustrates an example 300 of map information for a section of roadway including intersection 302. FIG. 3A depicts a portion of the map information that includes information identifying the shape, location, and other characteristics of lane markers or lane lines 304, 306, 308, median areas 310, 312, traffic signals 314, 316, as well as stop lines 318, 320, 322, 324. The lane lines may also define various lanes 326, 328, 330, 332, 334, 336, 338, 340, 342, 344, 346, 348 or these lanes may also be explicitly identified in the map information. In addition to these features, the map information may also include information that identifies the direction of traffic and speed limits for each lane as well as information that allows the computing device(s) to determine whether the vehicle has the right of way to complete a particular maneuver (e.g., to complete a turn or cross a lane of traffic or intersection), as well as other features such as curbs, buildings, waterways, vegetation, signs, etc.

Figure 3B:
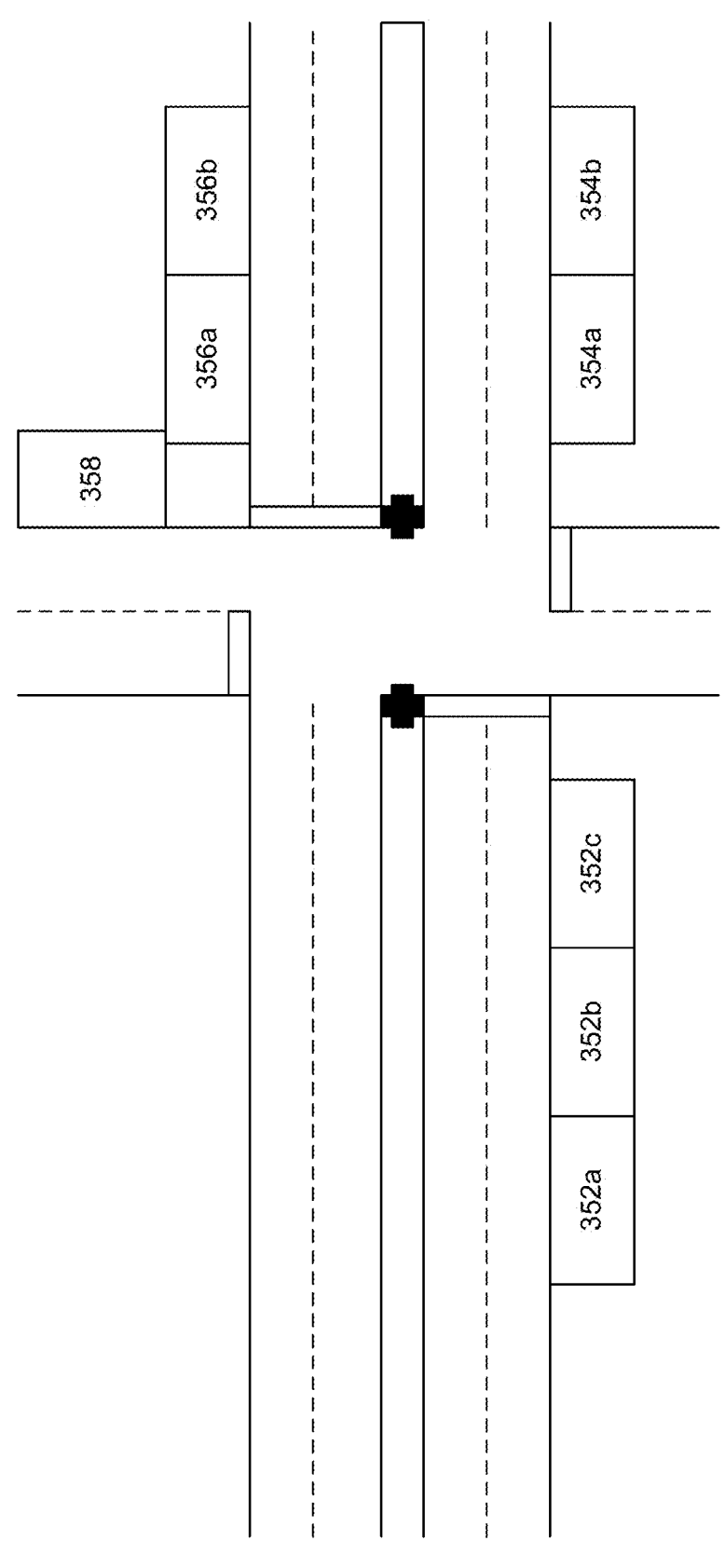
Figure 3C:
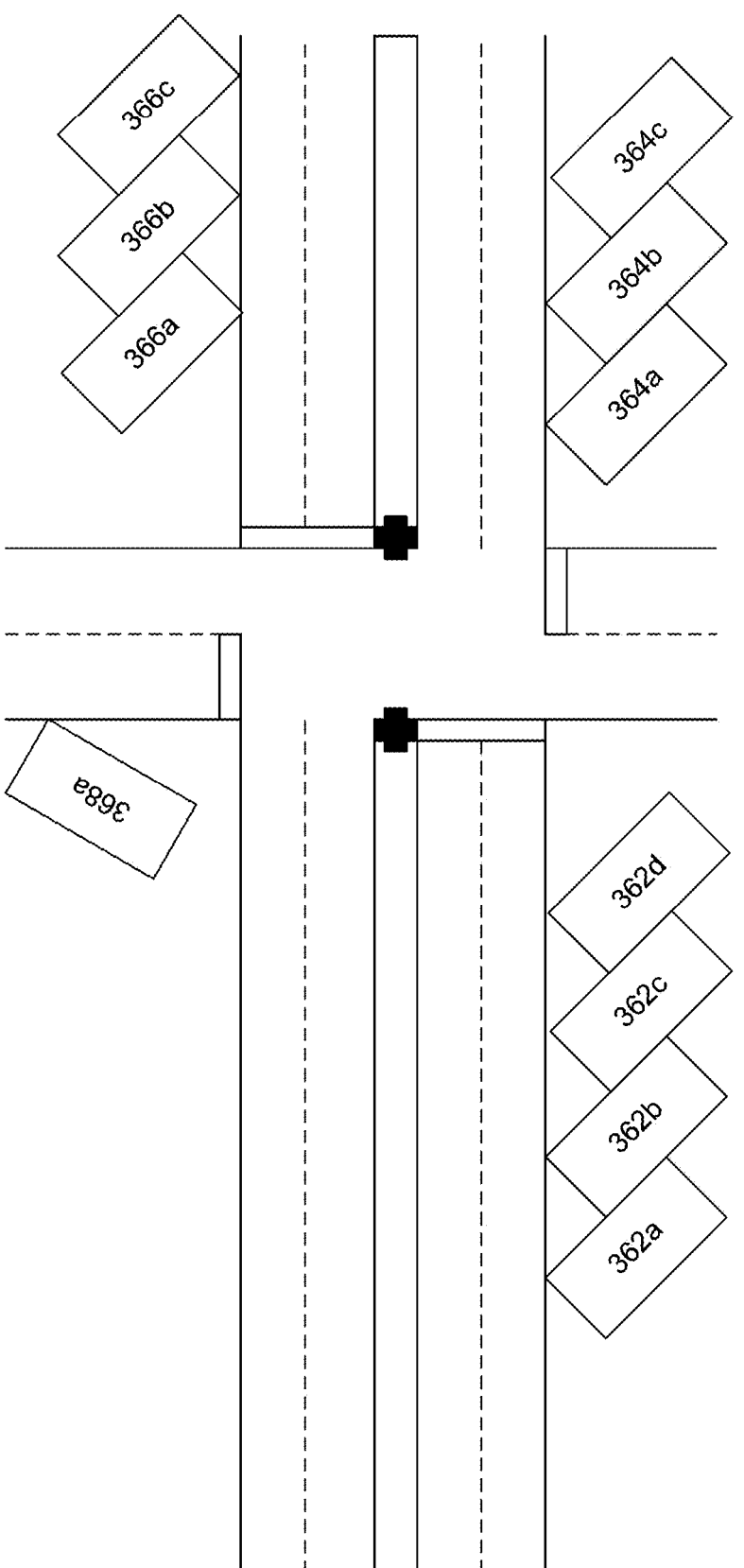

The map information may identify pullover locations which may include areas where a vehicle is able to stop and way to pick up a drop off passengers. These areas may correspond to parking spaces, waiting areas, shoulders, parking lots, etc. For instance, FIG. 3B illustrates an example 350 depicts parking spaces 352*a-c*, 354*a-b*, 356*a-b* and 358. In this example, the spaces 352-358 may all be parallel with the adjacent portion of the roadway. And FIG. 3C illustrates another example 360 depicting parking spaces 362*a-d*, 364*a-c*, 366*a-c* and 368. In this example, the spaces 362-368 may all be angled with the adjacent portion of the roadway. In other examples, there may be a mix of parallel and angled spaces. For simplicity, these pullover locations may correspond to parking spaces such as the aforementioned parking spaces, but may correspond to any type of area in which a vehicle is able to stop and way to pick up a drop off passengers, such as an idling zone.

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Here, each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the vehicle 100 must be moving in in order to follow the edge, in other words a direction of traffic flow. The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

The planner/routing module may use the roadgraph(s) to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (in which each edge may be associated with a cost to traverse that edge), type(s) of maneuvers required, convenience to passengers or the vehicle, discomfort to the passengers or other road users, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes may not only require information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop or yield signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Sensors, such as long and short range lidars, radar sensors, cameras or other imaging devices, etc., are used in vehicles that are configured to operate in an autonomous driving mode to detect objects and conditions in the environment around the vehicle. Each sensor may have a particular field of view (FOV) including a maximum range, and for some sensors a horizontal resolution and a vertical resolution. For instance, a panoramic lidar sensor may have a maximum scan range on the order of 70-100 meters, a vertical resolution of between $0.1°$-$0.3°$, and a horizontal resolution of between $0.1°$-$0.4°$, or more or less. A directional lidar sensor, for example to provide information about the nearby environment along a front, rear or side area of the vehicle, may have a maximum scan range on the order of 100-300 meters, a vertical resolution of between of between $0.05°$-$0.2°$, and a horizontal resolution of between $0.01°$-$0.03°$, or more or less.

Figure 4A:
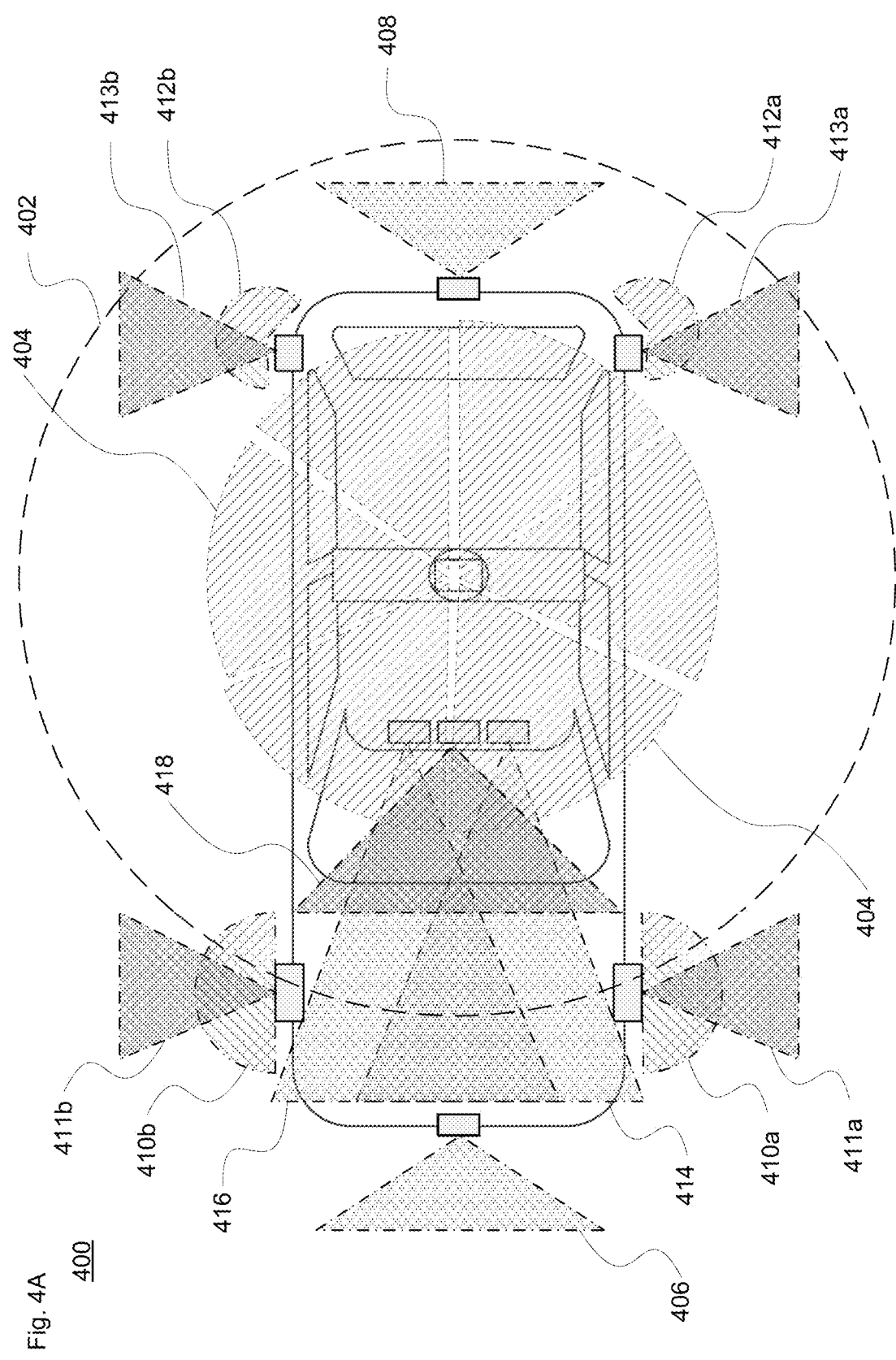
FIGS. 4A-B illustrates example sensor fields of view for a passenger-type vehicle in accordance with aspects of the disclosure.

FIG. 4A provides one example 400 of sensor fields of view relating to the sensors illustrated in FIG. 1B. Here, should the roof-top housing 102 include a lidar sensor as well as various cameras, radar units, infrared and/or acoustical sensors, each of those sensors may have a different field of view. Thus, as shown, the lidar sensor may provide a $360°$ FOV 402, while cameras arranged within the housing 102 may have individual FOVs 404. A sensor within housing 104 at the front end of the vehicle has a forward facing FOV 406, while a sensor within housing 112 at the rear end has a rearward facing FOV 408. The housings 106a, 106b on the driver's and passenger's sides of the vehicle may each incorporate lidar, radar, camera and/or other sensors. For instance, lidars within housings 106a and 106b may have a respective FOV 410a or 410b, while radar units or other sensors within housings 106a and 106b may have a respective FOV 411a or 411b. Similarly, sensors within housings 108a, 108b located towards the rear roof portion of the vehicle each have a respective FOV. For instance, lidars within housings 108a and 108b may have a respective FOV 412a or 412b, while radar units or other sensors within housings 108a and 108b may have a respective FOV 413a or 413b. And the series of sensor units 116 arranged along a forward-facing direction of the vehicle may have respective FOVs 414, 416 and 418. Each of these fields of view is merely exemplary and not to scale in terms of coverage range.

Figure 4B:
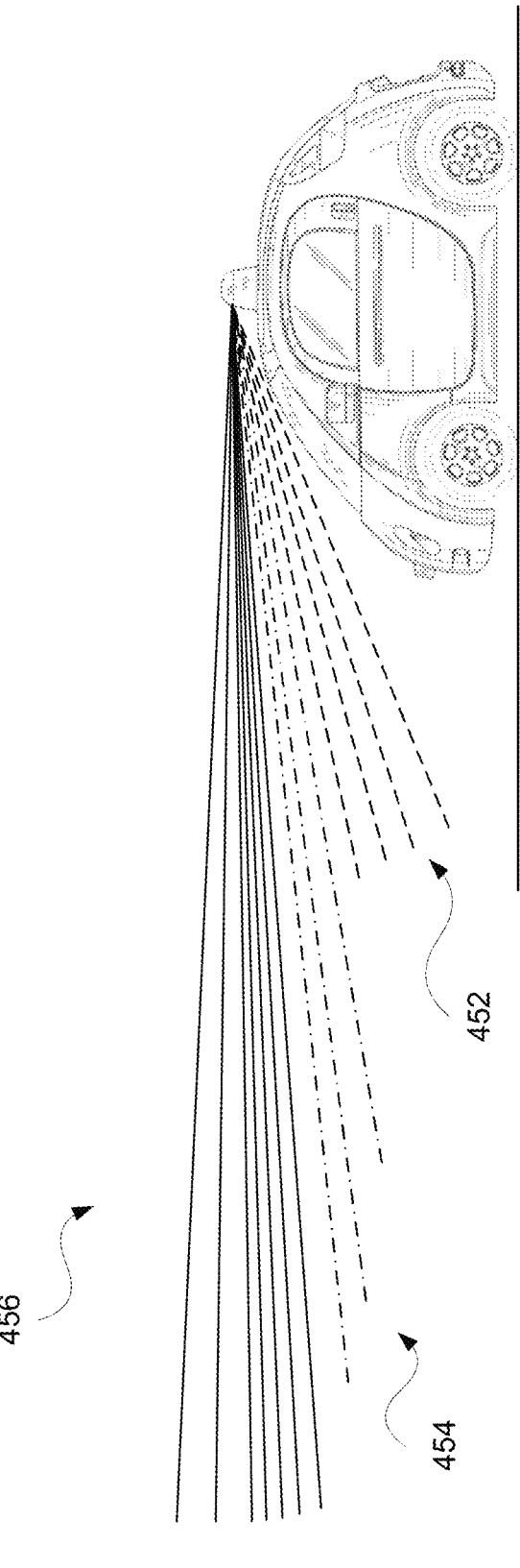

With regard to the maximum sensor range of, e.g., a laser, not all laser scans (shots) are the same. For instance, some laser shots are designed to see farther away while some are designed to see closer. How far a shot is designed to see is called maximum listening range. FIG. 4B illustrates a scenario 450, in which a set of one or more laser shots 452 represented by dashed lines has a first listening range, another set of shots 454 represented by dash-dot lines has a second listening range, and a third set of shots 456 represented by solid lines has a third listening range. In this example, set 452 has a close listening range (e.g., 2-10 meters) because these shots are arranged to point nearby toward the ground. The set 454 may have an intermediate listening range (e.g., 10-30 meters), for instance to detect nearby vehicles and other road users. And the set 456 may have an extended listening range (e.g., 30-200 meters) for objects that are far away. In this approach, the system can save resources (e.g., time).

The type of sensor, its placement along the vehicle, its FOV, horizontal and/or vertical resolution, etc., may all affect the information that the sensor obtains. Sometimes, an object or a location in the environment around the vehicle may not be detectable by the on-board sensors. This may be due to occlusion by another object, a sensor blind spot (e.g., due to sensor placement, dirt covering the sensor, etc.), environmental conditions or other situations.

Figure 5:
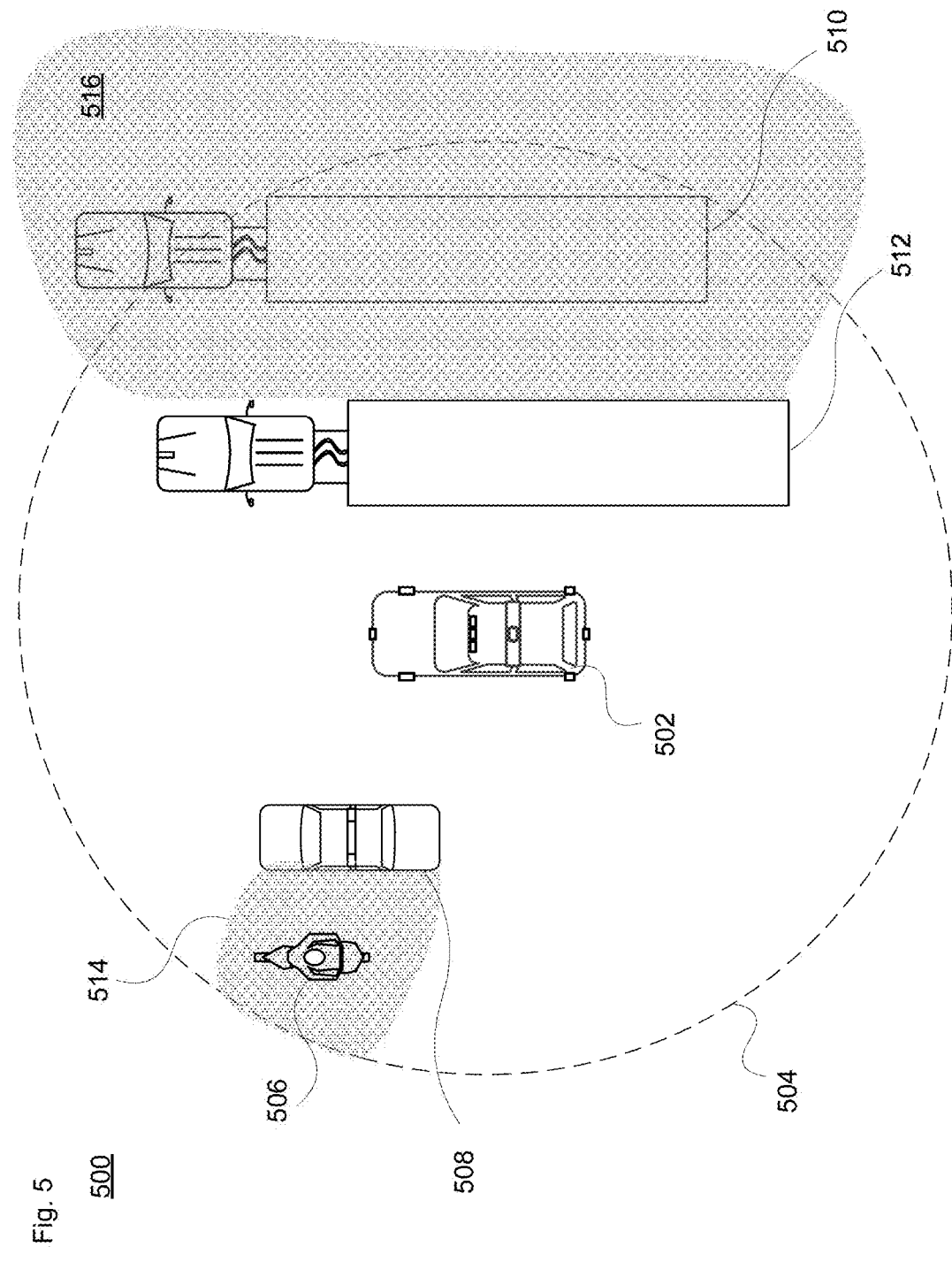
FIG. 5 illustrates an example of an occlusion situation in accordance with aspects of the disclosure.

It is important for the on-board computer system to understand whether there may be an occlusion, because knowing this can impact driving, route planning or pullover decisions, as well as off-line training and analysis. For example, FIG. 5 illustrates scenario 500, in which vehicle 502 uses a sensor, e.g., lidar or radar, to provide a 360° FOV, as shown by the circular dashed line 504. Here, a motorcycle 506 approaching vehicle 502 in the opposite direction may be obscured by a sedan or other passenger vehicle 508, while a truck 510 traveling in the same direction may be obscured by another truck 512 in between it and the vehicle 502, as shown by shaded regions 514 and 516, respectively.

Figure 6:
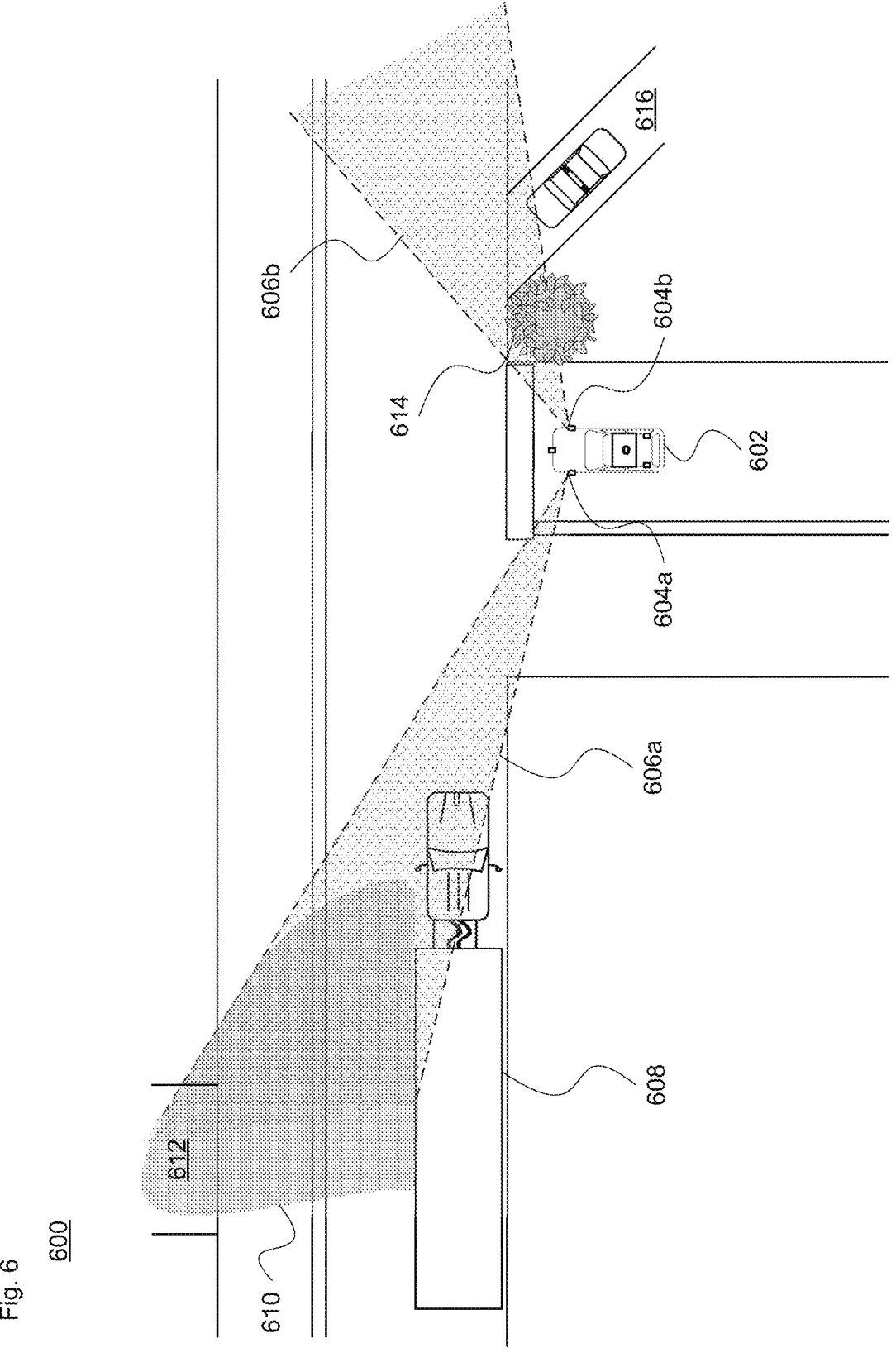
FIG. 6 illustrates another example of an occlusion situation in accordance with aspects of the disclosure.

FIG. 6 is a top-down view 600 illustrating another occlusion example. Here, a vehicle operating in an autonomous driving mode may be at a T-shaped intersection looking for a parking space. Here, side sensors 604a and 604b may be arranged to have corresponding FOVs shown by respective dashed regions 606a and 606b. In this example, truck 608 is approaching the intersection from the left of the vehicle 602. FOV 606a encompasses a front portion of the truck 608. However, as illustrated by shaded region 610, the truck 608 obscures (occludes) parking space 612, which is across the street from the vehicle 602. On the other side of the vehicle 602, FOV 606b is occluded by a shrub 614, which prevents recognition of another empty parking spot 616.

In such situations, the lack of information about an object in the surrounding environment (e.g., the location of another road user or the presence of an available parking spot) may lead to one driving decision, whereas if the vehicle were aware of a possible occlusion it might lead to a different driving decision.

Figure 7:
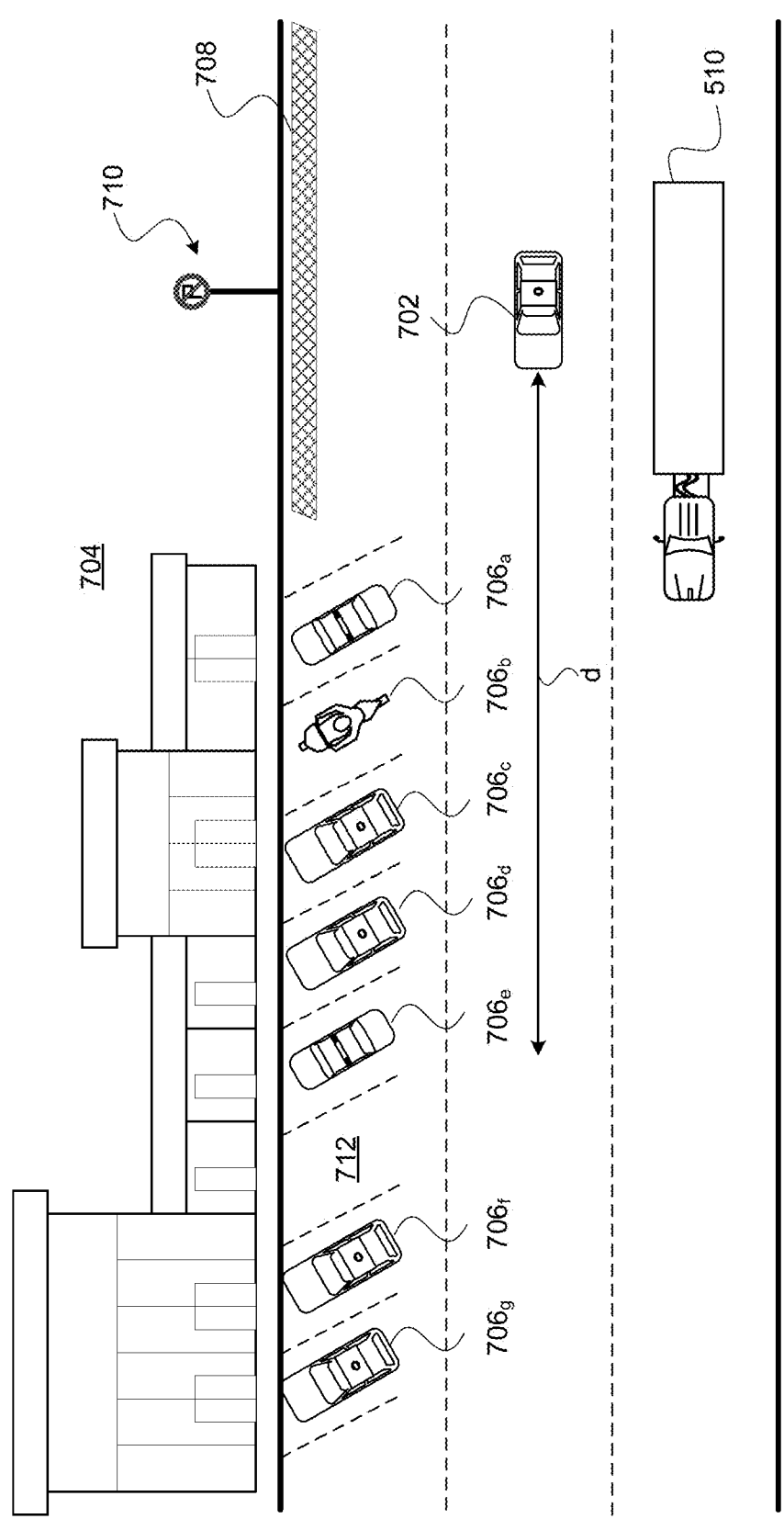
FIG. 7 illustrates a pullover scenario situation in accordance with aspects of the disclosure.

For instance, FIG. 7 illustrates an example 700 in which there is an available parking spot, but it is occluded. In this example, autonomous vehicle 702 approaches a set of stores 704, for instance to pick up a rider, a package or a food delivery. As shown, a number of vehicles 706 (e.g., vehicles $706_a, \ldots 706_g$) are parked in front of the stores 704, while another area 708 is not a permissible parking area as shown by no-parking sign 710. In this example, there is one currently vacant parking spot 712, but it is occluded from view by the sensors of vehicle 702.

Without knowing that there is a possibly open spot, the vehicle 702 may prematurely slow down some distance prior to the first spot with vehicle $706_a$. Alternatively, the vehicle 702 may suddenly decelerate once its sensors are able to detect that the spot 712 is open. Prematurely slowing down may inconvenience other road users following behind the vehicle 702. And heavy braking too close to the spot 712 may cause discomfort to riders in vehicle 702 or other road users that may need to quickly brake.

However, when the vehicle 702 is able to determine that parking spot 712 is occluded and likely available, and that it is a better option than others (e.g., such as driving around the block to look for another spot or to pull over and idle while waiting for any of vehicles $706_a$-$706_g$ to vacate a spot), then the vehicle 702 may begin to appropriately decelerate some distance d from the spot 712. If it turns out that the spot 712 is actually vacant, then the vehicle 702 will be able to easily pull over into the spot. And if it turns out that the spot 712 is not vacant or otherwise not suitable (e.g., due to a shopping cart, scooter, debris or other object in the spot), then the vehicle 702 can continue driving while looking for another pullover location without undue passenger discomfort or other road user inconvenience.

Example Scenarios

In accordance with aspects of the technology, the vehicle's computing system is able to generate selective ranges for slow driving regions in order to be able to perform pullovers when there may be viable parking spots that are occluded. This includes approaches for selectively slowing down the vehicle to maintain pullover quality (in comparison to an encompassing slow region), communicate intent to pull over to other road users, and perform the pullover maneuver at reduced speeds, all while reducing the time from starting to plan the pullover until the vehicle reaches the final pullover position.

For instance, the system can model slow region locations heuristically around the current pullover location, and potential alternative locations based on FOV and an optimistically predicted pullover cost. Such slow regions can maintain pullover quality, as potential pullover spots can remain achievable due to the shortened braking distance. The intent to pull over can be communicated to other agents by going slow for the chosen pullover spot and potential secondary locations. The slow region around the chosen pullover spot and any potential secondary pullover spots can ensure that a maneuver, even after a late change in pullover location, should be performed at or below the speed of the slow region.

Generally, the system seeks to identify the potential good pullover locations along the trajectory so that the computing system (e.g., planner/routing module 223) causes the vehicle to slow down only around those locations. More particularly, the output of the discussed approach can include pairs of waypoint indexes that represent segments of the trajectory that contain the potential good pullover locations.

In a typical system, when performing the pullover location selection (especially for parallel parking along the street), the system may consider many factors to determine the "goodness" of a pullover location (in particular, of a pullover waypoint). Such factors include the angle cost (meaning what's final angle of the car would be like if the car pulled over in the location), the double-parking cost (meaning if the car have to double park in the location), the hydrant cost (meaning if the car is blocking fire hydrants), the spatial-information related cost (e.g., how big the space is for pullover), etc. All the different components are then combined into a final aggregated cost that represents the holistic quality of a waypoint for pullover. Then, a final pullover location may be selected by searching for the location with the lowest cost. One important factor among these is the lateral gap available between the rightmost lane (in a US-type road configuration, or the leftmost lane in a UK-type road configuration) and the road curb (supposing the road curb is empty), which can be especially important when the vehicle considers parallel parking along the road. The notation of the available lateral gap is formulated as various types of "offset", as explained herein. However, the exact size of the lateral gap is sometimes not visible due to occlusions, which can entail some reasoning logic to work with the uncertainty in some locations.

Figure 8:
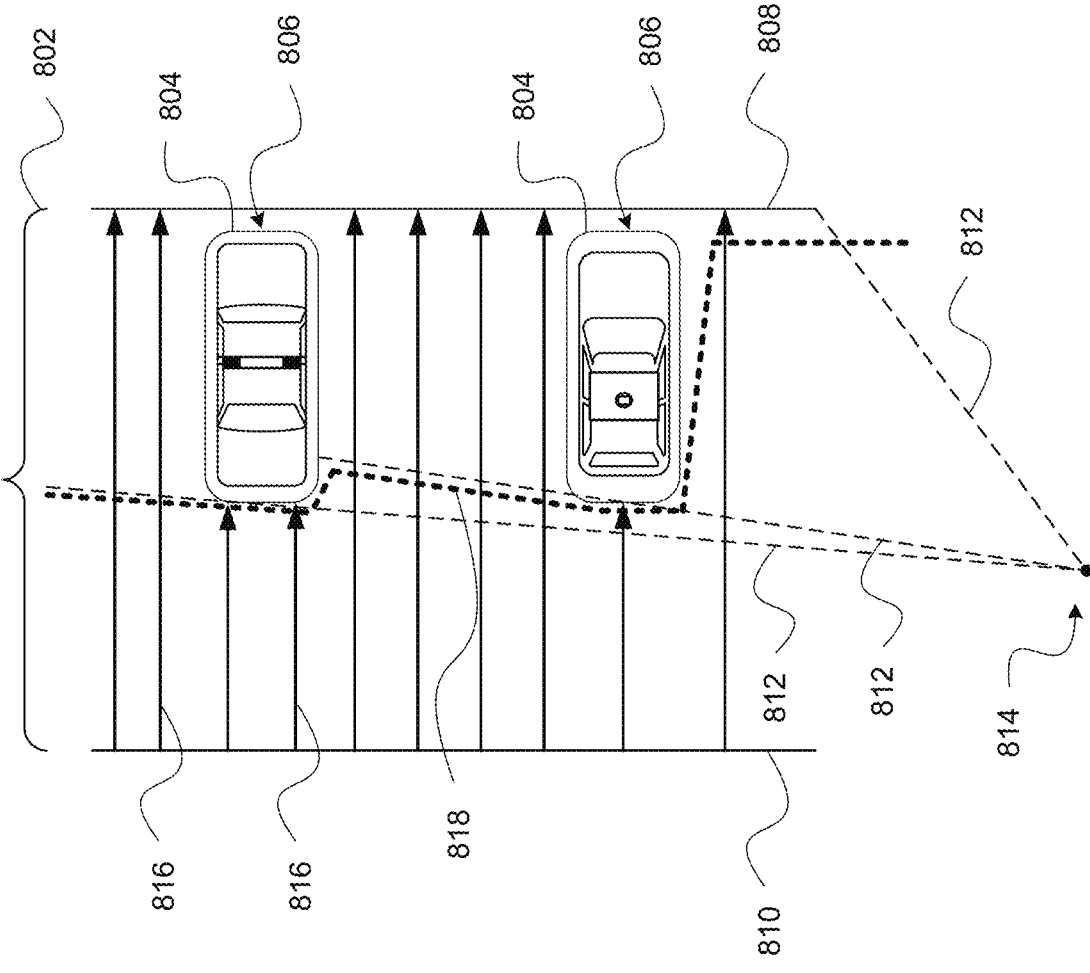
FIG. 8 illustrates an example of field of view limitations in accordance with aspects of the disclosure.

On the other hand, as discussed above the vehicle may encounter FOV limitations to some pullover locations due to occlusions. One example of this is shown in view 800 of FIG. 8. Here, bracketed region 802 indicates a side of a roadway, and bounding boxes 804 encompass vehicles 806 that are parked along the curb. Line 808 indicates the curb or other road edge, and line 810 indicates a baseline position offset some distance from the road edge, which encompasses the parked vehicles 806. Line 808 may be known from stored map data and/or information from the vehicle's perception system. Dashed lines 812 are shown to indicate sensor signals (e.g., lidar, radar or image sensor signals) received by a sensor 814 of the vehicle (not shown).

The solid (horizontal) arrows 816 illustrate the clearance offset at a particular location. The clearance offset is the offset around everything the vehicle's sensors can detect and otherwise assume as being unoccupied (e.g., no vehicle at that position). This represents an optimistic assumption. The dotted line 818 is the FOV restricted offset, which is the offset around everything the vehicle's sensors can detect and otherwise how far there is a FOV (to the right, in this situation). Here, anything to the right of the dotted line 818 (between dotted line 818 and line 808) can be considered to be occluded. The portions of the arrows 816 to the right of the dotted line 818 indicate regions with possible optimistic options for pullover locations that are currently occluded.

During the cost calculation, the system uses the offset concept to model a location's closeness to the road curb (e.g., line 808). The spatial-information related cost can be computed from the offset for a final cost calculation, as discussed further below.

Figure 9A:
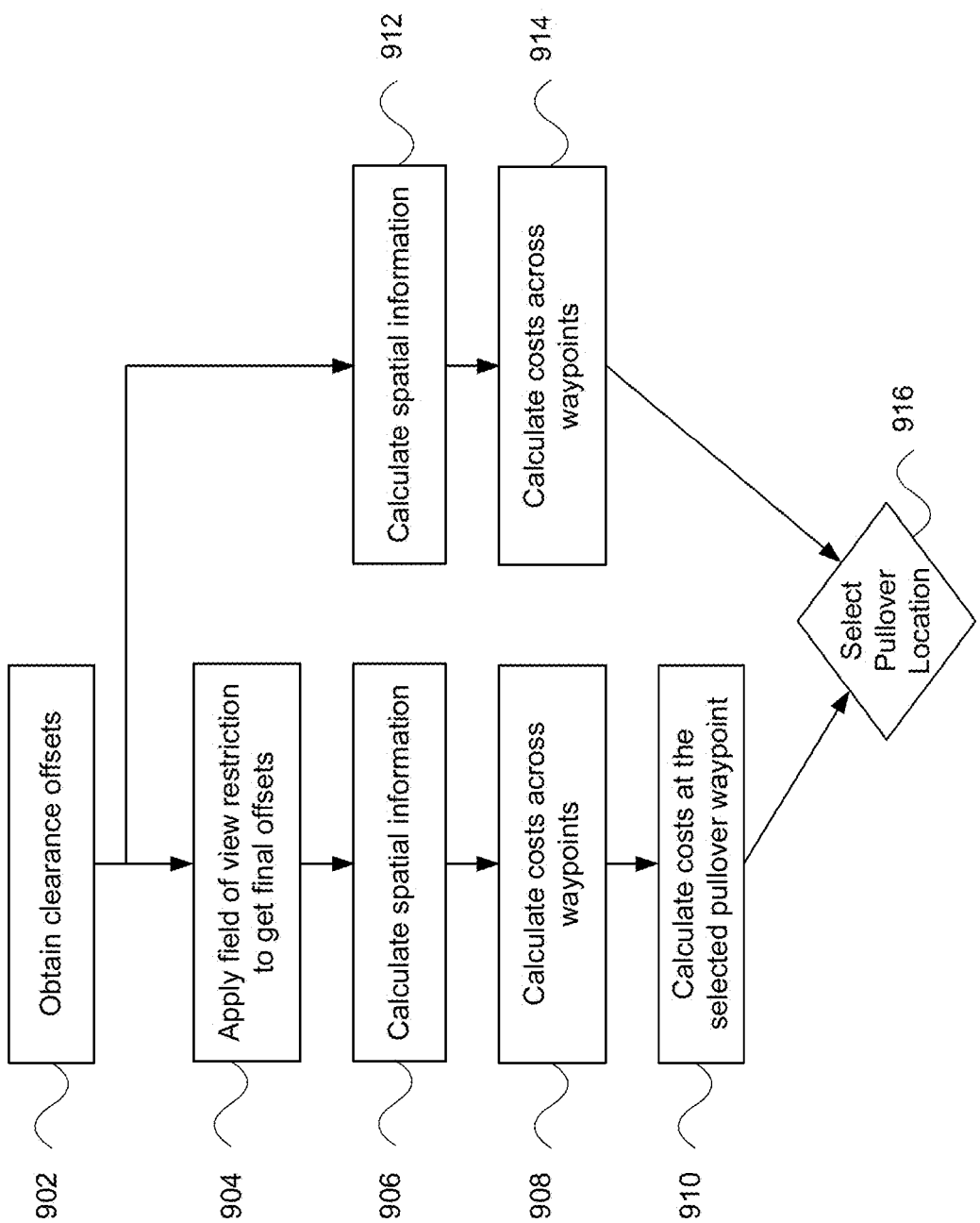
FIGS. 9A-B illustrate a pullover selection process in accordance with aspects of the disclosure.

FIG. 9A illustrates a process 900 showing an approach for whether to select an occluded pullover location instead of another pullover location, which may be performed by the planner/routing module 223 or another part of the computing system of the vehicle. At block 902, the system obtains (e.g., calculates) clearance offsets to the side of the road/curb. In one scenario, when identifying blind-spot locations as possible pullover locations, the process may conservatively restrict the computed offsets to those locations because the true closeness to the road curb is unknown. Thus, those locations have the true potential to emerge to be good (or even better) pullover locations as the vehicle approaches closer, which may result in a reduction or elimination of an occlusion of such locations.

In order to systematically identify those potentially viable locations, at block 904 the system first applies the FOV restrictions to the clearance offsets, based on an optimistic assumption that those out-of-sight locations can be very close to road curbs. This results in a final set of offsets. Then, from the new offset(s), the system calculates new final costs to guide the selection of the potential good pullover locations. This includes calculating spatial information at block 906, and using the spatial information to calculate costs across waypoints at block 908. Once the costs across the waypoints have been calculated, at block 910 the system calculates costs at a selected pullover waypoint.

In a parallel process, at block 912 the spatial information is calculated from the obtained clearance offsets, but without applying the FOV restriction. From this, at block 914 the system calculates costs across the waypoints, providing a baseline that does not take the FOV restriction into account. Finally, at block 916, a comparison is performed between the baseline from block 914 and the costs calculated at a selected pullover point from block 910. Here, the baseline final cost at the selected pullover waypoint is used as a threshold for selection. In particular, those waypoints whose final costs from block 910 are lower than the threshold will be selected as the potential good pullover locations. While the cost may be marginally lower (e.g., on the order of 1-5% lower), in other instances the cost may be significantly lower (e.g., on the order of 10-30% lower). In one scenario, an occluded waypoint having a final cost marginally lower than the threshold may not be selected, while another occluded waypoint having a significantly lower final cost than the threshold would be selected (e.g., at least 7-10% lower). Alternatively, the system could tighten the baseline criterion by lowering the threshold by some fixed values.

In view of this, consider a parallel parking scenario when picking up and dropping up riders. Here, the offsets determine the expected lateral gap for pullover on the side of the road. From the offsets and the system's driving capability, the system calculates how the vehicle would end up being positioned if the system decided to park the vehicle there (e.g., the final parking angle and how far the vehicle would be from the nearest lane if parking there). That information is encapsulated as the "spatial information" in block 906 and block 912. From the spatial information, the system calculates the costs of the pullover in different aspects, for example the distance from the road edge, the parked angle, the distance from the requested pullover location, etc. The costs of such different aspects will be further aggregated into a final cost to express how good the location is. This calculation corresponds to what is performed in each of block 908 and block 914.

In one scenario, at block 902 three subtypes of offsets may be calculated: a clearance offset, a FOV limited offset, and a predicted offset, in which the offset finally being used for the cost calculations (at blocks 908 and 914) is the combination of all the three subtypes of offsets. As noted above, the clearance offset is an offset around everything the vehicle can detect via its perception system and otherwise is assumed to be unoccupied. The FOV limited offset is the offset around everything that can be detected and otherwise how far to the (right) side of the roadway the vehicle has a FOV. The predicted offset is an offset around everything that can be detected by the perception system. The concept of the predicted offset is used by the system to estimate what the offset would be in the occluded waypoints. The system knows whether a particular waypoint is towards a driveway or not from the map information. Thus, if the waypoint is towards a driveway, the system can predict there are no parked cars and hence can extend the offset to the road curb. Otherwise, the system would use the detected offset that is within the FOV.

Once the potential pullover location(s) has been selected, the system is able to compute one or more "slow" regions in which the vehicle will reduce speed, so that the vehicle will be able to pull into the pullover location without exceeding a pullover deceleration limit, a discomfort threshold or other criteria. The output of this computation may comprise pairs of waypoint indices that represent segments of the vehicle trajectory that are slow regions. This information can be applied to a speed solving pipeline of the planner/routing module. The system can use this information to control the steering, deceleration and/or acceleration systems of the vehicle accordingly.

The computing system may constantly continue looking for the "best" pullover location using an updated current location, updated vehicle dynamics, updated sensor data, etc. This may continue, for example, until some point after the vehicle reaches a pullover start location of a selected pullover location and begins to laterally shift or otherwise turn towards the selected pullover location. Thus, the system may perform an iterative or subsequent evaluation by repeating the process of FIG. 9A as the vehicle approaches potential pullover locations, as the vehicle should have more sensor information from the perception system. This may be done regularly (such as every 0.X seconds, e.g., every 0.2, 0.4, 0.6, 0.8 or 1.0 seconds, or more or less). Thus, a spot that was previously identified as a potential pullover location may be determined to be better than other locations. Or, a spot that was occluded but considered likely to be a very good pullover location may turn out to not be a viable option, for instance because more recent sensor information indicates that a shopping cart, scooter, debris or other object is in the spot. The process of FIG. 9A can also be determined for all of the spots that might be good, rather than for just a single spot. The process could be performed concurrently for each spot. The system may maintain a set of potential pullover locations in memory, continually updating the set as the evaluation process described herein is repeated.

Figure 9B:
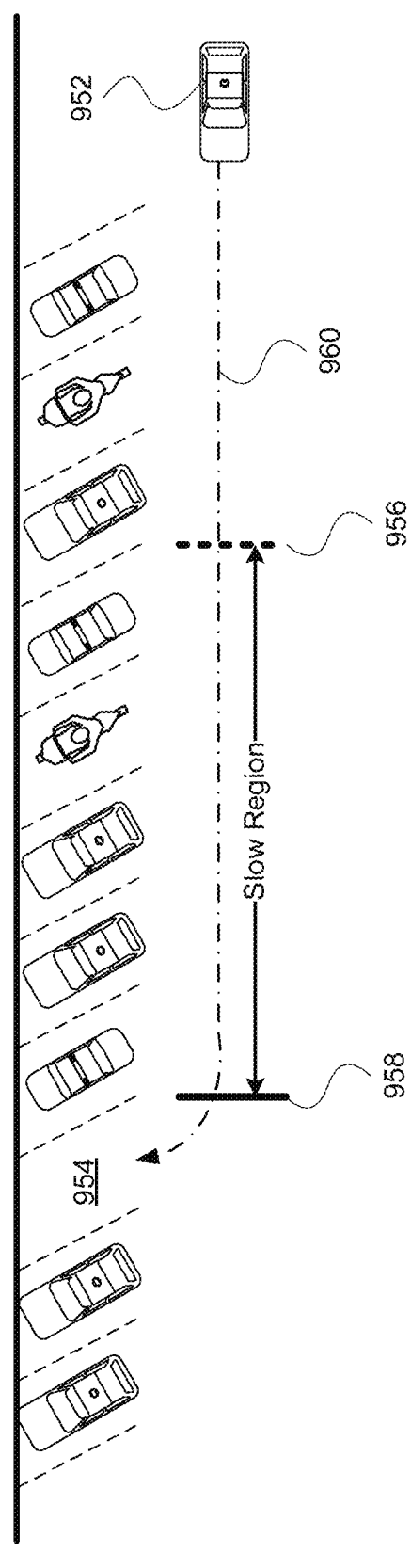

FIG. 9B illustrates a scenario 950, in which a potential pullover location has been identified by the process of FIG. 9A. In this scenario, vehicle 952 is driving along a roadway and identifies spot 954 as possibly being available. Since all of the other visible spots are occupied, here spot 954 has a significantly lower cost than any other options on this portion of the roadway. Assume the speed limit on this portion of the roadway is 25 mph. Upon the selection of spot 954, the system determines a slow region beginning at point 956 and ending at point 958, which will allow the vehicle 952 to pull into the spot 954 in accordance with any deceleration or lateral turn limit, discomfort threshold or other criteria as it follows pullover trajectory 960. By way of example, in the slow region the vehicle 952 may slow down from 25 mph to 5 mph. This may be accompanied by actuating a turn signal to indicate to other road users the intent to pull over.

Figure 10:
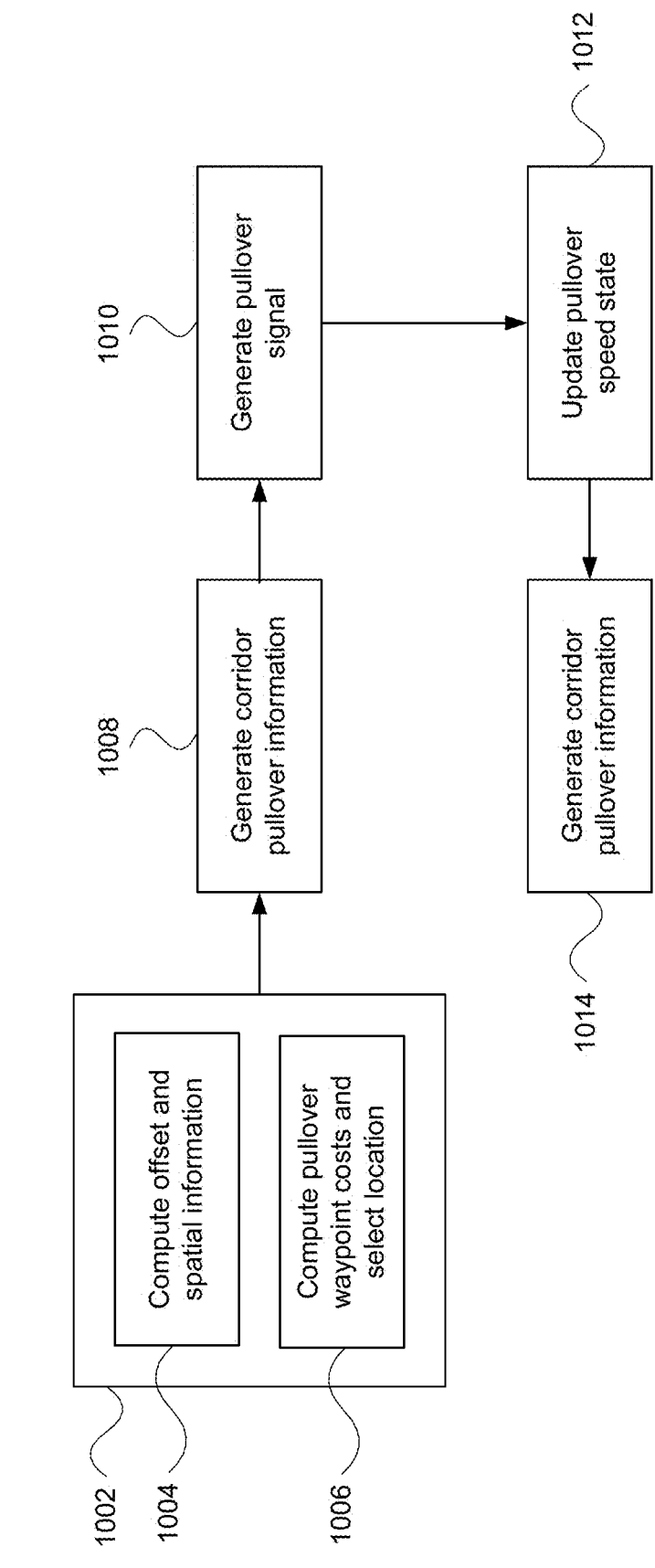
FIG. 10 illustrates a general speed planning approach in accordance with aspects of the disclosure.

FIG. 10 illustrates a general approach 1000 for the speed pipeline used in pullover planning. First, at block 1002, a first module determines a pullover selection that contains all the cost-related information that matters for pullover location selection. For instance, in sub-block 1004 the system calculates additional spatial information (e.g., corresponding to block 912) based on an unrestricted clearance offset. Then in sub-block 1006, the system computes new final costs from the new spatial information (corresponding to block 914). The output pullover selection from block 1002 is provided to block 1008. Here, a second module computes corridor pullover information, which adds on more information about the roadgraph and the initially planned trajectory. The information output from block 1008 includes both the new and the old costs, which are passed to a module in block 1010. Here, the system computes the slow regions by the aforementioned process (corresponding to block 916). For instance, this module is configured to compute a pullover signal used by the vehicle's systems, which may abstract all of the redundant information into only geometry-related signals, such as desired lateral gaps from other road users and speed related signals such as slow regions. The pullover signal is provided to block 1012, at which a module will further consolidate all speed-related signals, such as computing the overall slow region. The slow region information from generated at block 1012 is then passed to block 1014, where the slow regions will be appropriately set up. Here, for instance, the system will put those speed signals into effect, such as putting up slow regions or stop fences that can be used by the planner/routing module to control the trajectory and route of the vehicle in an autonomous driving mode.

Offboard systems may use the pullover-related information discussed above to perform autonomous simulations based on real-world or man-made scenarios, or metric analysis to evaluate pullover approaches or general speed planning that might be impacted by parking location occlusion. This information may be used in model training. It can also be shared across a fleet of vehicles to enhance the perception and route or trajectory planning for those vehicles.

Figure 11A:
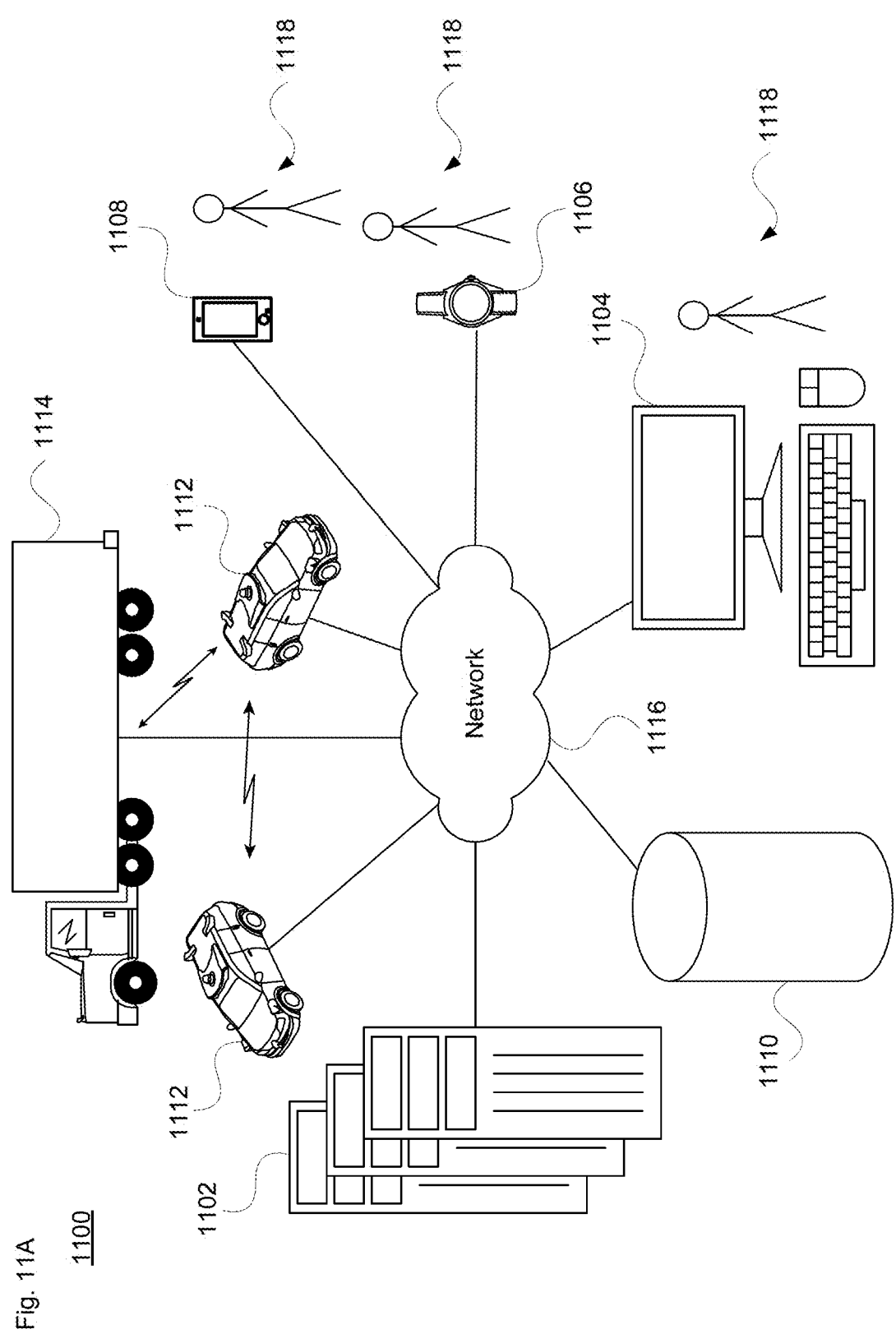
FIGS. 11A-B illustrate an example system in accordance with aspects of the disclosure.
Figure 11B:
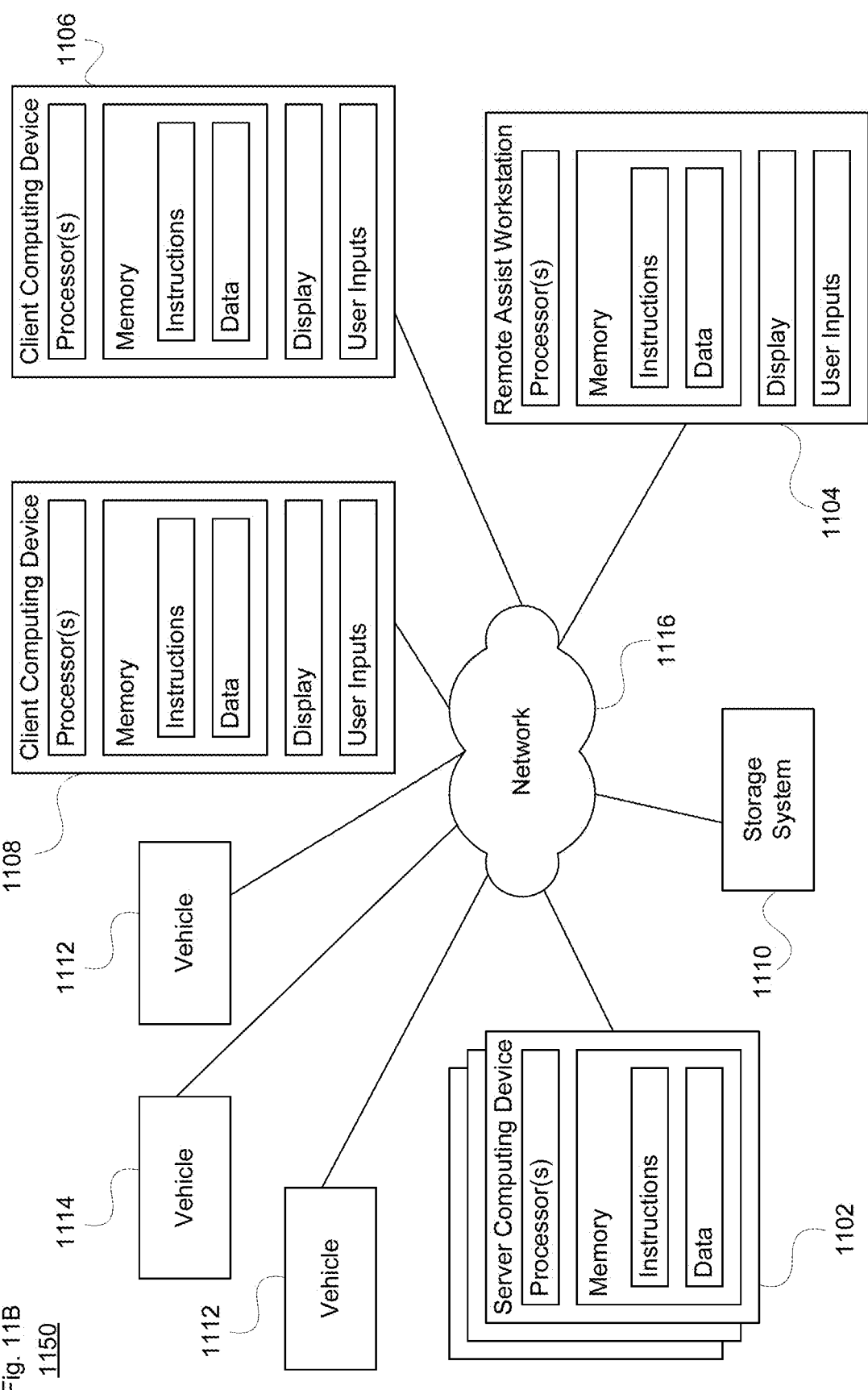

One such arrangement is shown in FIGS. 11A and 11B. In particular, FIGS. 11A and 11B are pictorial and functional diagrams, respectively, of an example system 1100 that includes a plurality of computing devices 1102, 1104, 1106, 1108 and a storage system 1110 connected via a network 1116. System 900 also includes smaller vehicles such as cars 1112 and larger vehicles such as deliver trucks 1114. Vehicles 1112 and/or vehicles 1114 may be part of a fleet of vehicles. Although only a few vehicles and computing devices are depicted for simplicity, a typical system may include significantly more.

As shown in FIG. 11B, each of computing devices 1102, 1104, 1106 and 1108 may include one or more processors, memory, data and instructions. Such processors, memories, data and instructions may be configured similarly to the ones described above with regard to FIG. 2.

The various computing devices and vehicles may communicate via one or more networks, such as network 1116. The network 1116, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1102 may include one or more server computing devices having a plurality of computing devices, e.g., a load balanced server farm, that exchange information with different nodes of a network for the purpose of receiving, processing and transmitting the data to and from other computing devices. For instance, computing device 1102 may include one or more server computing devices that are capable of communicating with the computing devices of vehicles 1112 and/or 1114, as well as computing devices 1104, 1106 and 1108 via the network 1116. For example, vehicles 1112 and/or 1114 may be a part of a fleet of vehicles that can be dispatched by a server computing device to various locations. In this regard, the computing device 1102 may function as a dispatching server computing system which can be used to dispatch vehicles to different locations in order to pick up and drop off passengers and/or to pick up and deliver cargo. In addition, server computing device 1102 may use network 1116 to transmit and present information to a user of one of the other computing devices or a passenger of a vehicle. In this regard, computing devices 1104, 1106 and 1108 may be considered client computing devices.

As shown in FIG. 11A each client computing device 1104, 1106 and 1108 may be a personal computing device intended for use by a respective user 1118, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1106 and 1108 may be mobile phones or devices such as a wireless-enabled PDA, a tablet PC, a wearable computing device (e.g., a smartwatch), or a netbook that is capable of obtaining information via the Internet or other networks.

In some examples, client computing device 1104 may be a remote assistance workstation used by an administrator or operator to communicate with passengers of dispatched vehicles. Although only a single remote assistance workstation 1104 is shown in FIGS. 11A-11B, any number of such workstations may be included in a given system. Moreover, although the workstation is depicted as a desktop-type computer, workstations may include various types of personal computing devices such as laptops, netbooks, tablet computers, etc.

Storage system 1110 can be of any type of computerized storage capable of storing information accessible by the server computing devices 1102, such as a hard-drive, memory card, ROM, RAM, DVD, CD-ROM, flash drive and/or tape drive. In addition, storage system 1110 may include a distributed storage system where data is stored on a plurality of different storage devices which may be physically located at the same or different geographic locations. Storage system 1110 may be connected to the computing devices via the network 1116 as shown in FIGS. 11A-B, and/or may be directly connected to or incorporated into any of the computing devices.

In a situation where there are passengers, the vehicle or remote assistance may communicate directly or indirectly with the passengers' client computing device. Here, for example, information may be provided to the passengers regarding current driving operations, changes to the route in response to the situation, modification to pullover locations, etc.

FIG. 12 illustrates an example method of operation 1200 of a vehicle. The method includes, at block 1202, receiving, sensor data obtained from an external environment of a vehicle configured to operate in an autonomous driving mode, the external environment including a roadway. At block 1204, the method includes obtaining, based on the received sensor data, a clearance offset to a side of the roadway. At block 1206, the method includes applying a field of view restriction to the clearance offset to obtain a final offset. The field of view restriction corresponds to one or more occluded areas along the side of the roadway. At block 1208, the method includes calculating a cost for each pullover location of a set of possible pullover locations based on the final offset. At block 1210, the method includes comparing the cost for each pullover location against a baseline set of costs that does not take into account the field of view restriction. And at block 1212, the method includes selecting, based on the comparison, a pullover location along the roadway.

Finally, as noted above, the technology is applicable for various types of vehicles, including passenger cars, motorcycles, vans, buses, RVs, delivery trucks, cargo vehicles or the like.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method, comprising:
obtaining, by one or more processors of a computing system, a clearance offset to a side of a roadway based on sensor data;
applying, by the one or more processors, a field of view restriction to the clearance offset to obtain a final offset, the field of view restriction corresponding to one or more occluded areas along the side of the roadway with respect to a vehicle;
comparing, by the one or more processors for a set of possible pullover locations, one or more respective factors based on the final offset to one or more baseline factors;
selecting, by the one or more processors based on the comparison, a pullover location along the side of the roadway; and
causing, by the one or more processors, the vehicle to perform a pullover maneuver in an autonomous driving mode according to the selected pullover location.

2. The method of claim 1, wherein causing the vehicle to perform the pullover maneuver includes determining a slow region beginning at a first point prior to the selected pullover location and ending at a second point farther from a current position of the vehicle than the first point.

3. The method of claim 1, wherein at least one pullover location of the set of possible pullover locations is an occluded location.

4. The method of claim 1, further comprising determining, by the one or more processors, the one or more respective factors for the set of possible pullover locations.

5. The method of claim 4, wherein determining the one or more respective factors includes determining spatial information and using the spatial information associated with the set of possible pullover locations.

6. The method of claim 5, wherein determining the spatial information includes determining a position of the vehicle when parked at a given one of the possible pullover locations.

7. The method of claim 6, wherein determining the position of the vehicle includes estimating a parking angle and a distance from the vehicle to a nearest driving lane.

8. The method of claim 5, wherein determining the spatial information includes evaluating one or more of a distance from a road edge, a parking angle, or a distance from a requested pullover location.

9. The method of claim 1, wherein the final offset is based on the clearance offset, a field of view limited offset, and a predicted offset.

10. The method of claim 9, wherein the field of view limited offset encompasses detectable objects from sensor data obtained by a perception system of the vehicle.

11. The method of claim 10, wherein the field of view limited offset further encompasses a field of view of the vehicle of the side of the roadway.

12. The method of claim 9, wherein the predicted offset is an offset around objects detectable by a perception system of the vehicle.

13. The method of claim 1, wherein the one or more baseline factors are one or more thresholds associated with selecting the pullover location.

14. The method of claim 1, wherein selecting the pullover location includes determining whether a given factor for a pullover location associated with any of the one or more occluded areas is below a threshold by a selected amount.

15. A vehicle comprising:

a control system including one or more processors and configured to:

receive sensor data;

obtain, based on the received sensor data, a clearance offset to a side of a roadway;

apply a field of view restriction to the clearance offset to obtain a final offset, the field of view restriction corresponding to one or more occluded areas along a side of the roadway with respect to the vehicle;

compare, for a set of possible pullover locations, one or more respective factors based on the final offset to one or more baseline factors;

select, based on the comparison, a pullover location along the side of the roadway; and cause the vehicle to perform a pullover maneuver in an autonomous driving mode according to the selected pullover location.

16. The vehicle of claim 15, wherein the control system is further configured to determine the one or more respective factors for the set of possible pullover locations.

17. The vehicle of claim 15, wherein the control system is further configured to determine a slow region beginning at a first point prior to the selected pullover location and ending at a second point farther from a current position of the vehicle than the first point.

18. The vehicle of claim 15, wherein the final offset is based on the clearance offset, a field of view limited offset, and a predicted offset.

19. The vehicle of claim 15, wherein the one or more baseline factors are one or more thresholds associated with selecting the pullover location.

20. A non-transitory, tangible, computer-readable medium on which instructions are stored, the instructions, when executed by one or more processors, cause the one or more processors to implement a method, the method comprising:

obtaining a clearance offset to a side of a roadway based on sensor data;

applying a field of view restriction to the clearance offset to obtain a final offset, the field of view restriction corresponding to one or more occluded areas along the side of the roadway with respect to a vehicle;

comparing, for a set of possible pullover locations, one or more respective factors based on the final offset to one or more baseline factors;

selecting, based on the comparison, a pullover location along the side of the roadway; and causing the vehicle to perform a pullover maneuver in an autonomous driving mode according to the selected pullover location.

* * * * *